US012762758B2

(12) United States Patent
Boyd et al.

(10) Patent No.: US 12,762,758 B2
(45) Date of Patent: Oct. 13, 2026

(54) GENERATING IMAGE SCENARIOS BASED ON EVENTS

(71) Applicant: Snap Inc., Santa Monica, CA (US)

(72) Inventors: Nathan Kenneth Boyd, Los Angeles, CA (US); Evan Spiegel, Los Angeles, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 164 days.

(21) Appl. No.: 18/634,489

(22) Filed: Apr. 12, 2024

(65) Prior Publication Data

US 2025/0131609 A1 Apr. 24, 2025

Related U.S. Application Data

(60) Provisional application No. 63/592,397, filed on Oct. 23, 2023.

(51) Int. Cl.
*G09G 5/00* (2006.01)
*G06F 3/0484* (2022.01)
(Continued)

(52) U.S. Cl.
CPC ............ *G06T 11/60* (2013.01); *G06F 3/0484* (2013.01); *G06F 3/0488* (2013.01);
(Continued)

(58) Field of Classification Search
CPC .... G06F 9/4401; G06F 3/0484; G06F 3/0488; G06F 16/532; G06F 40/40;
(Continued)

(56) References Cited

U.S. PATENT DOCUMENTS 10,055,465 B2 8/2018 Wang et al.
10,582,125 B1 3/2020 Roessler et al.
(Continued)

FOREIGN PATENT DOCUMENTS

WO WO-2025090420 A1 5/2025
WO WO-2025090518 A1 5/2025
(Continued)

OTHER PUBLICATIONS

"International Application Serial No. PCT US2024 052265, International Search Report mailed Jan. 20, 2025", 4 pgs.
(Continued)

*Primary Examiner* — Gordon G Liu
(74) *Attorney, Agent, or Firm* — Schwegman Lundberg & Woessner, P.A.

(57) ABSTRACT

Methods and systems are disclosed for suggesting scenarios for an image using one or more machine learning models based on a detected event. The methods and systems detect, by an interaction system associated with a first user, an event associated with a second user and generate a prompt comprising the event and a request for a plurality of scenarios that are relevant to the event. The methods and systems process the prompt by a large language model (LLM) to generate the plurality of scenarios that are relevant to the event and present an individual content item corresponding to an individual scenario of the plurality of scenarios.

20 Claims, 13 Drawing Sheets

(51) Int. Cl.

| | |
|---|---|
| ***G06F 3/0488*** | (2022.01) |
| ***G06F 16/532*** | (2019.01) |
| ***G06F 40/40*** | (2020.01) |
| ***G06N 3/0895*** | (2023.01) |
| ***G06T 11/00*** | (2006.01) |
| ***G06T 11/60*** | (2006.01) |
| ***G06V 40/16*** | (2022.01) |
| ***H04L 51/216*** | (2022.01) |
| ***H04N 5/265*** | (2006.01) |

(52) U.S. Cl.

CPC ............ *G06F 16/532* (2019.01); *G06F 40/40* (2020.01); *G06N 3/0895* (2023.01); *G06T 11/00* (2013.01); *G06V 40/172* (2022.01); *H04L 51/216* (2022.05); *H04N 5/265* (2013.01)

(58) Field of Classification Search

CPC ..... G06F 3/04883; G06T 1/20; G06T 3/4007; G06T 9/00; G06T 11/001; G06T 11/60; G06T 11/00; H04L 51/51; H04L 51/216; H04L 51/222; G06V 10/44; G06V 40/172; G06N 3/0895; H04N 5/265

USPC .......................................................... 345/581

See application file for complete search history.

(56) References Cited

U.S. PATENT DOCUMENTS

| | | | | |
|---|---|---|---|---|
| 11,055,119 | B1 * | 7/2021 | Silverstein | G06N 3/08 |
| 11,150,782 | B1 | 10/2021 | Underwood et al. | |
| 12,039,431 | B1 | 7/2024 | Deutsch et al. | |
| 12,063,123 | B1 | 8/2024 | Rivera-rodriguez | |
| 2012/0290950 | A1 * | 11/2012 | Rapaport | H04L 12/1818 715/753 |
| 2014/0204125 | A1 | 7/2014 | Smith | |
| 2015/0016669 | A1 | 1/2015 | Tabb | |
| 2016/0078582 | A1 | 3/2016 | Bhathena et al. | |
| 2017/0048184 | A1 | 2/2017 | Lewis et al. | |
| 2017/0147581 | A1 | 5/2017 | Srinivasan et al. | |
| 2017/0149714 | A1 | 5/2017 | Valdivia et al. | |
| 2018/0004754 | A1 | 1/2018 | Lin et al. | |
| 2020/0112690 | A1 | 4/2020 | Harrison et al. | |
| 2020/0150832 | A1 | 5/2020 | Winn et al. | |
| 2020/0320341 | A1 | 10/2020 | Khurana et al. | |
| 2021/0201208 | A1 | 7/2021 | Bhole et al. | |
| 2021/0243150 | A1 * | 8/2021 | Vasamsetti | G06F 16/125 |
| 2021/0272253 | A1 | 9/2021 | Lin et al. | |
| 2022/0093103 | A1 | 3/2022 | Shin et al. | |
| 2022/0156336 | A1 | 5/2022 | Zhuang et al. | |
| 2022/0180452 | A1 | 6/2022 | Lopez et al. | |
| 2022/0222876 | A1 | 7/2022 | Loui et al. | |
| 2022/0286438 | A1 | 9/2022 | Burke, Jr. et al. | |
| 2022/0321963 | A1 | 10/2022 | Wu et al. | |
| 2023/0300396 | A1 | 9/2023 | Panchaksharaiah et al. | |
| 2023/0360282 | A1 | 11/2023 | Blackburne et al. | |
| 2023/0377016 | A1 | 11/2023 | Agrawal et al. | |
| 2024/0086469 | A1 | 3/2024 | Jayaraman et al. | |
| 2024/0107122 | A1 | 3/2024 | Akhoury et al. | |
| 2024/0135611 | A1 | 4/2024 | Costin et al. | |
| 2024/0289556 | A1 | 8/2024 | Dillon et al. | |
| 2024/0290331 | A1 | 8/2024 | Lu et al. | |
| 2024/0311576 | A1 | 9/2024 | Mikutel et al. | |
| 2024/0323275 | A1 * | 9/2024 | Dasher | G06V 40/172 |
| 2024/0346731 | A1 | 10/2024 | Graham et al. | |
| 2024/0411906 | A1 | 12/2024 | White | |
| 2024/0427852 | A1 | 12/2024 | Pandey et al. | |
| 2025/0014245 | A1 | 1/2025 | Xu et al. | |
| 2025/0014606 | A1 | 1/2025 | Wong et al. | |
| 2025/0078323 | A1 | 3/2025 | Paliarush et al. | |
| 2025/0078347 | A1 | 3/2025 | Couleaud et al. | |
| 2025/0085131 | A1 * | 3/2025 | Dasher | G06T 19/00 |
| 2025/0086554 | A1 * | 3/2025 | Durvasula | G06Q 10/0637 |
| 2025/0130696 | A1 | 4/2025 | Mourkogiannis et al. | |
| 2025/0131034 | A1 | 4/2025 | De Juan et al. | |
| 2025/0131605 | A1 | 4/2025 | Mekel | |
| 2025/0131623 | A1 | 4/2025 | Boyd et al. | |
| 2025/0131624 | A1 | 4/2025 | Boyd et al. | |
| 2025/0157103 | A1 | 5/2025 | Inkpen et al. | |
| 2025/0260770 | A1 | 8/2025 | Hassan et al. | |

FOREIGN PATENT DOCUMENTS

| | | | |
|---|---|---|---|
| WO | WO-2025090531 | A1 | 5/2025 |
| WO | WO-2025090619 | A1 | 5/2025 |
| WO | WO-2025090619 | A8 | 4/2026 |

OTHER PUBLICATIONS

"International Application Serial No. PCT US2024 052265, Written Opinion mailed Jan. 20, 2025", 7 pgs.

"International Application Serial No. PCT US2024 052583, International Search Report mailed Jan. 23, 2025", 3 pgs.

"International Application Serial No. PCT US2024 052583, Written Opinion mailed Jan. 23, 2025", 7 pgs.

"International Application Serial No. PCT US2024 052449, International Search Report mailed Jan. 24, 2025", 4 pgs.

"International Application Serial No. PCT US2024 052449, Written Opinion mailed Jan. 24, 2025", 6 pgs.

Hyunggu, Jung, "Personas and Scenarios to Design Technologies for North Korean Defectors with Depression", Computer Supported Cooperative Work and Social Computing, ACM, 2 Penn Plaza, Suite 701 New York NY, (Feb. 25, 2017), 8 pgs.

Jung, Hyunggu, "Toward Value Scenario Generation Through Large Language Models", Proceedings of the 15th ACM Web Science Conference 2023, Acmpub27, New York, NY, USA, (Oct. 14, 2023), 9 pgs.

"U.S. Appl. No. 18/634,369, Non Final Office Action mailed Oct. 16, 2025", 71 pgs.

"U.S. Appl. No. 18/634,369, Response filed Dec. 3, 2025 to Non Final Office Action mailed Oct. 16, 2025", 11 pgs.

"U.S. Appl. No. 18/634,588, Non Final Office Action mailed Nov. 5, 2025", 69 pgs.

"U.S. Appl. No. 18/634,588, Response filed Dec. 11, 2025 to Non Final Office Action mailed Nov. 5, 2025", 11 pgs.

"(CVPR 2023) T2M-GPT", Mael-zys / T2M-GPT, [Online]. Retrieved from the Internet: <URL: https://web.archive.org/web/20230318085515/https://github.com/Mael-zys/T2M-GPT>, (Archived on Mar. 18, 2023), 7 pgs.

"[1.1.222] Preprocessor: inpaint_only+lama #1597", Mikubill / sd-webui-controlnet, [Online]. Retrieved from the Internet: <URL: https://web.archive.org/web/20230609034228/https://github.com/Mikubill/sd-webui-controlnet/discussions/1597>, (Archived on Jun. 9, 2023), 8 pgs.

"Alternative Text", Office for Digital Accessibility (ODA), University of Minnesota, [Online]. Retrieved from the Internet: <URL: https://web.archive.org/web/20250114041208/https://accessibility.umn.edu/getting-started/learn-7-core-accessibility-skills/alternative-text>, (Archived on Jan. 14, 2025), 13 pgs.

"U.S. Appl. No. 18/608,607, Non Final Office Action mailed Jan. 26, 2026", 31 pgs.

"U.S. Appl. No. 18/608,607, Response filed Feb. 18, 2026 to Non Final Office Action mailed Jan. 26, 2026", 11 pgs.

"U.S. Appl. No. 18/634,369, Corrected Notice of Allowability mailed Mar. 10, 2026", 2 pgs.

"U.S. Appl. No. 18/634,369, Notice of Allowance mailed Feb. 19, 2026", 23 pgs.

"U.S. Appl. No. 18/634,588, Final Office Action mailed Mar. 18, 2026", 85 pgs.

"Contrast Checker", WebAIM, web accessibility in mind, [Online]. Retrieved from the Internet: <URL: https://web.archive.org/web/20230627014602/https://webaim.org/resources/contrastchecker/ >, (Archived on Jun. 27, 2023), 2 pgs.

"Deforum Stable Diffusion", deforum / deforum-stable-diffusion, [Online]. Retrieved from the Internet: <URL: https://web.archive.

(56) References Cited

OTHER PUBLICATIONS org/web/20230311215452/https://github.com/deforum/deforum-stable-diffusion>, (Archived on Mar. 11, 2023), 7 pgs.
"Improved 3D Ken Burns effect", pierlj / ken-burns-effect, [Online]. Retrieved from the Internet: <URL: https://github.com/pierlj/ken-burns-effect>, (Retrieved on Apr. 24, 2026), 6 pgs.
"Infinite Zoom extension for Stable Diffusion WebUI", v8hid / infinite-zoom-automatic1111-webui, [Online]. Retrieved from the Internet: <URL: https://web.archive.org/web/20230730045723/https://github.com/v8hid/infinite-zoom-automatic1111-webui>, (Archived on Jul. 30, 2023), 6 pgs.
"International Application Serial No. PCT/US2024/052427, International Search Report mailed Jan. 22, 2025", 3 pgs.
"International Application Serial No. PCT/US2024/052427, Written Opinion mailed Jan. 22, 2025", 8 pgs.
"Make apps more accessible", Apple Developers, [Online]. Retrieved from the Internet: <URL: https://web.archive.org/web/20230129035201/https://developer.android.com/guide/topics/ui/accessibility/apps>, (Archived on Jan. 29, 2023), 5 pgs.
"Supporting VoiceOver in your app", Apple Developer, [Online]. Retrieved from the Internet: <URL: https://developer.apple.com/documentation/uikit/supporting-voiceover-in-your-app>, (Retrieved on Apr. 10, 2025), 7 pgs.
"Text Legibility", Material Design, [Online]. Retrieved from the Internet: <URL: https://web.archive.org/web/20230107134917/https://m2.material.io/design/color/text-legibility.html#legibility-standards>, (Archived on Jan. 7, 2023), 16 pgs.
Noever, David, et al., "Decoding Imagery: Unleashing Large Language Models", Arxiv.Org, Cornell University Library, 201 Olin Library Cornell University Ithaca, NY 14853, (Aug. 17, 2023), 27 pgs.
Zhang, Jianrong, et al., "T2M-GPT: Generating Human Motion from Textual Descriptions with Discrete Representations", arXiv:2301.06052v4 [cs.CV], (Sep. 24, 2023), 15 pgs.

* cited by examiner

600

Prompt

610

Your Job is to Take an Update About My Friend and Describe Five Dynamic Scenarios or Circumstances that Reference it (also Consider Distance from Today's Date, if Relevant), and Would be Fun to Share to that Friend, Featuring My Friend and Me. if I'm not Physically Nearby My Friend, the Message Accompanying the Image Should Speak to that Formo. Describe the Scene With Unique Details that are Relevant; Keep Qualifying Attributes that Hint at Style or Aesthetic, Without Using Formal Brand or Intellectual Property Names. Always Include A Detail About the Activity. No Guns. No Drugs. Reimagine IP Protected Brand, Character, or Product Names so You Don't Reference them Specifically. Occasionally Provide A Short Fun or Funny Caption, But Not Always.

Each Description Should be One Phrase, Short, no More than 150 Characters. It Should also Include Words Describing the Framing. Include Details of Facial Expression Include Details of Outfits. no Scenes That'd Have Eye Masks, no Face Coverings, no Goggles. Be Specific About Context, not Generic.

If You Cannot Generate Something, Return "ERROR", But Only if It's Inappropriate.

For All of the Image_description, Follow a Phrase Structure of:
"close up selfie:" ["one person" or "two people"], [Succinct Keywords (not Phrases) About Specific Outfit & Accessory Details (no People Names)]. Posing for Photo [in what Context/location]"

Also Return the Plaintext of a Message. It Should be Written from my Perspective (Possibly FOMO Vibes) Written in the 1st Singular Person Unless Talking about Both me and my Friend, and it Should Reference the Update from my Friend; Messages Should Strive to be Clever, Funny, Satirical. Sarcastic and Resonate with Someone who is 13-17yrs Old. Keep it Short and Snapchatty- Favor Funny, Gen-z Humor; Less is more. Make Caption in English. Add Sparkle Emoji to Front and End of the Message.

For Expression, Choose the Relevant Mood for Each Participant from the Following Choices that will make this Moment Most Sharable: "smirking", "winking", "lughing", "crying", "mad", "confused", "eyes closed", "smiling", "laugh with tongue out".

Always Return all Ideas in a JSON Array in English Language. Ex:

```
[
{"idea01"
"image_description": "[description of pose. scenario. & outfit context]",
"participant1": "[@username]",
"particpant1_details": "[detailed description of outfit & accessories, hairstyle, etc... no names]"
"participant1_ expression": "[expression goes here]"
"message": "✨ [from me to my friend about their update, don't use their name] ✨",
},
{"idea02"
"image_description": "[description of pose, scenario, & outfit context]",
"participant1": "[@username]",
"participant1_details": "[detailed description of outfit & accessories, hairstyle, etc...]"
"participant1_expression": "[expression goes here]",
"participant2": "[@username]",
"participant2_details": "[detailed description of outfit & accessories, hairstyle, etc...]",
"participant2_expression": "[expression goes here]"
},
etc...
```

620

Input Structure

Current Date: [Month, Day, Year]

Me:
Username: [@user or User ID]
Gender: [bitmoji gender]
My Location: [Neighborhood (if available), Locality Admin Area_1]

-New Update about Friend-
Friend:
Username: [@user or User ID]
Gender: [bitmoji gender]
Update Details: [Activity Center Update Title]

630

*FIG. 6*

EXAMPLE OUTPUT

700

```
[
{
"image _description": "close up selfie: man, wearing a black leather
jacket and sunglasses, posing for photo in front of the Hollywood sigh".
"participant1": "@user1".  712
"participant1_details": "black leather jacket, sunglasses, messy hair".  714
"participant1_expression": "winking".  716
"message": "✨Missing out on all the hollywood glamour while you're  718
off in paris, huh?✨"
}.
{
"image _description": "close up selfie: man and woman, wearing  721
matching berets and striped shirts, posing for photo in front of the Eiffel
Tower"
"participant1": "@user1".  722
"participant1_details": "striped shirt, beret, holding a baguette".
"participant1_expression": "happy".
"participant2": "@user2".  724
"participant2_details": "striped shirt, beret, holding a croissant".
"participant2_expression": "laughing".
"message": "✨Look who's living their best french life! I'm just here with  728
my baguette and FOMO.✨"
}.
{
"image _description": "close up selfie: man, wearing a Hawaiian shirt and
sunglasses, posing for photo on a sunny beach".
"participant1": "@user1".
"participant1_details": "Hawaiian shirt, sunglasses, beachy hair".
"participant1_expression": "laughing".
"message": "✨While i'm stuck in sunny california, you're living it up on
The beaches of Paris! So unfair!✨"
}.
{
"image _description": "close up selfie: man and women, wearing cozy
sweaters and scarves, posing for photo in a charming Parisian cafe".
"participant1": "@user1".
"participant1_details": "cozy sweater, scarf, holding a cup of coffee".
"participant1_expression": "winking".
"participant2": "@user2".
"participant2_details": "cozy sweater, scarf, holding a croissant".
"participant2_expression": "happy".
"message": "✨Enjoying the cozy cafes of Paris without me? How dare
You!✨"
}.
{
"image _description": "close up selfie: man, wearing a leather jacket and
sunglasses, posing for photo in front of the Louvre Museum".
"participant1": "@user1".
"participant1_details": "leather jacket, sunglasses, messy hair".
"participant1_expression": "mad".
"message": "✨So jealous of your artsy adventures in Paris! Can't
believe i'm missing out on the Louvre!✨"
}.
]
```

710

720

730

FIG. 7

GENERATING IMAGE SCENARIOS BASED ON EVENTS

CLAIM OF PRIORITY

This application is a non-provisional of and claims priority to U.S. Provisional Application No. 63/592,397, filed Oct. 23, 2023, which is hereby incorporated by reference herein in its entirety.

TECHNICAL FIELD

The present disclosure relates generally to operating an interaction application for sharing content items.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like. In general, these AR and/or VR systems are referred to as extended reality (XR) systems.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 6-9 are diagrammatic representations of example inputs and outputs of the sharable content item feed system, in accordance with some examples.

DETAILED DESCRIPTION

Figure 1:
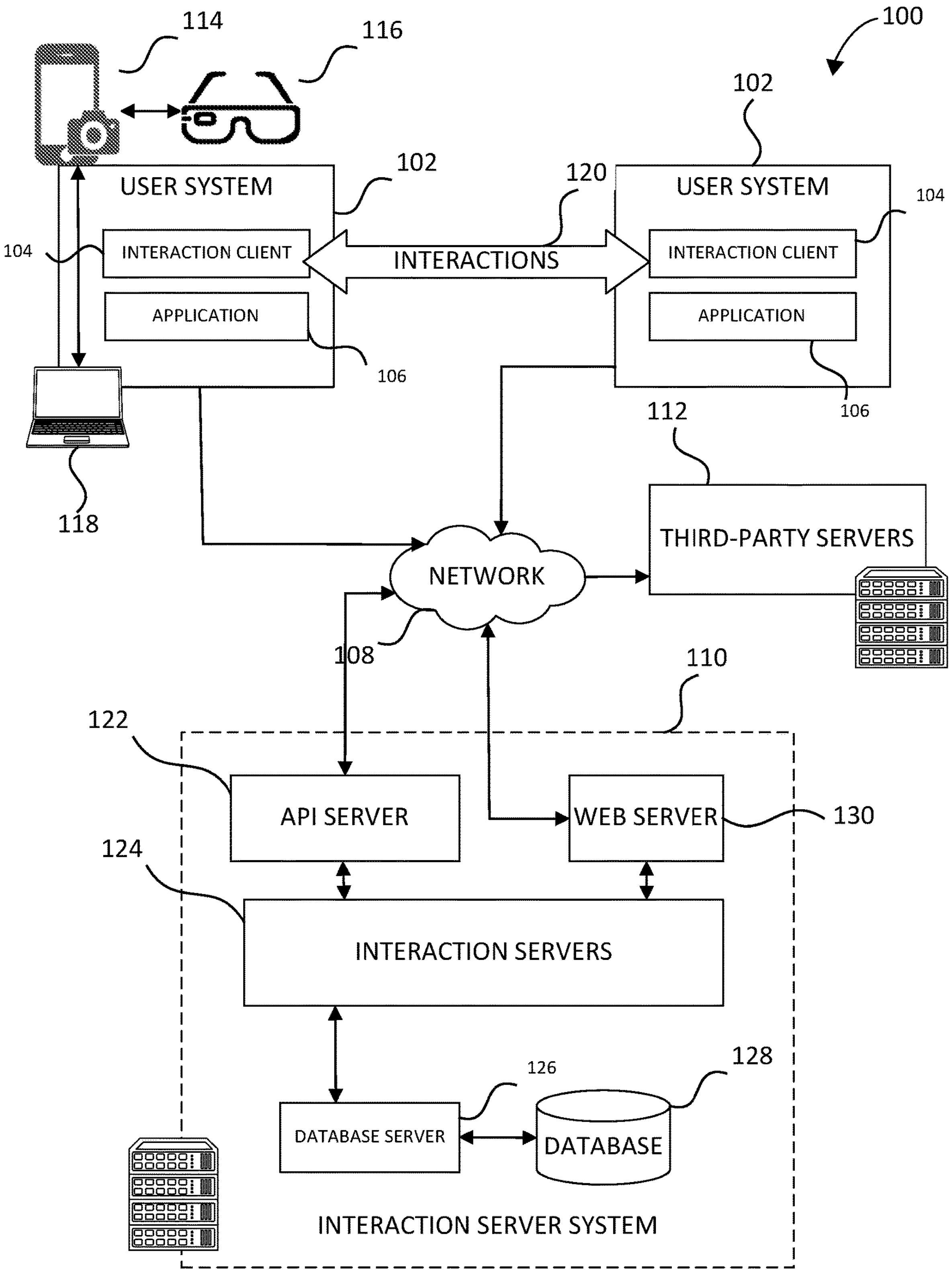
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Generative ML models (e.g., AI that generates content) are currently popular methods for programming certain operations and actions and can potentially generate content from two-dimensional (2D) models, three-dimensional (3D) models, code, and more. However, in order to properly operate these generative ML models and obtain results that are satisfactory, specific prompts need to be provided along with specific types of inputs. Generating these prompts and selecting the inputs to drive the generative ML models is very time consuming and expensive, which further detracts from their overall use and enjoyment. As such, users typically avoid using these generative ML models to enhance content items to be shared with other users.

The disclosed techniques seek to improve the efficiency of using an electronic device by intelligently and automatically generating large language model (LLM) prompts for selecting content items that a user may be interested in sharing. The disclosed techniques then automatically process the prompts by a generative ML model and/or the LLM to modify and improve various visual aspects of selected content items. This can reduce the overall time and expense incurred to generating useful prompts for automatically generating/finding content items to share with other users. In addition, the disclosed techniques leverage learned information about users to dynamically generate context-sensitive prompts for the generative ML models to personalize the modifications that the generative ML models perform for each individual content item in the selected content items.

For example, the disclosed techniques detect, by an interaction system associated with a first user, an event associated with a second user and generate a prompt comprising the event and a request for a plurality of scenarios that are relevant to the event. The disclosed techniques process the prompt by a LLM to generate the plurality of scenarios that are relevant to the event and present an individual content item corresponding to an individual scenario of the plurality of scenarios. In this way, the disclosed techniques improve the overall experience of the user in using the electronic device and reduce the overall amount of resources needed to accomplish a task of producing high-quality and unique sharable content items. Namely, continuously running LLMs using different manually generated prompts until a specific content item of interest is generated or until a modification of interest is found consumes a great deal of time and resources. By automatically generating useful prompts, content items of interest can quickly and efficiently be generated by the LLMs which reduces the overall amount of resources needed to accomplish a task at least by reducing the number of iterations the LLMs need to perform.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server

112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a UI of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact to, for example, launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
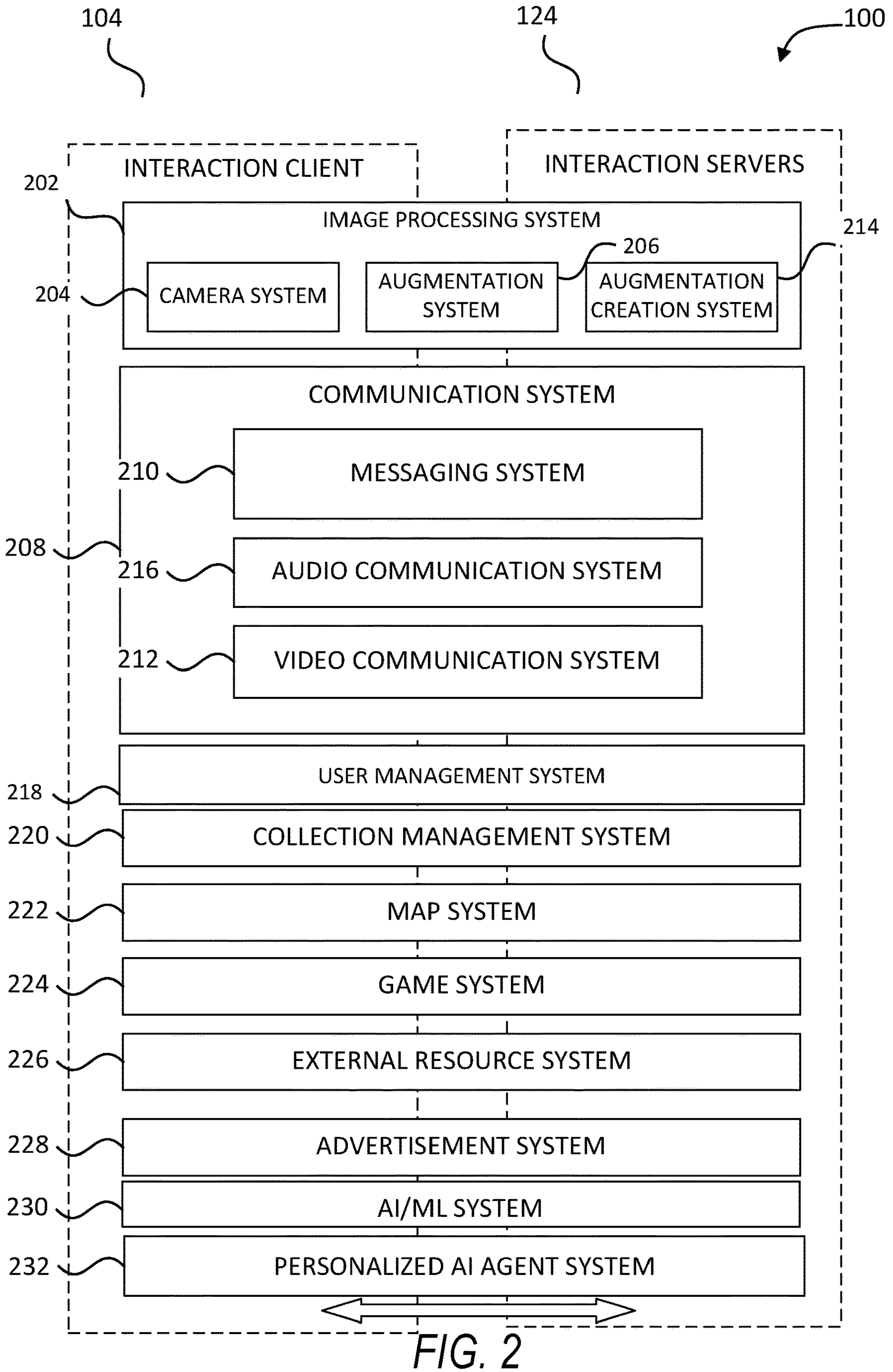
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client side by the interaction client 104 and on the server side by the interaction servers 124.

In some examples, these subsystems are implemented as microservices. A microservice subsystem (e.g., a microservice application) may have components that enable it to operate independently and communicate with other services. Example components of a microservice subsystem may include:

- Function logic: The function logic implements the functionality of the microservice subsystem, representing a specific capability or function that the microservice provides.
- API interface: Microservices may communicate with other components through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102 (e.g., previously captured images). Certain examples are discussed with respect to images but similar techniques apply to any sort of content item, including animations, graphics, videos, audio files, image collages, and so forth. For example, the augmentation system 206 operatively selects, presents, and displays media overlays (e.g., an image filter or an image lens) to the interaction client 104 for the augmentation of real-time images received via the camera system 204 or stored images retrieved from memory (shown in FIG. 12) of a user system 102. These augmentations are selected by the augmentation system 206 and presented to a user of an interaction client 104, based on a number of inputs and data, such as, for example:

- Geolocation of the user system 102; and
- Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo and/or video) at user system 102 for communication in a message, or applied to video content, such as a video content stream or feed transmitted from an interaction client 104. As such, the image processing system 202 may interact with, and support, the various subsystems of a communication system 208, such as a messaging system 210 and a video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example, custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within a user management system 218) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

Figure 3:
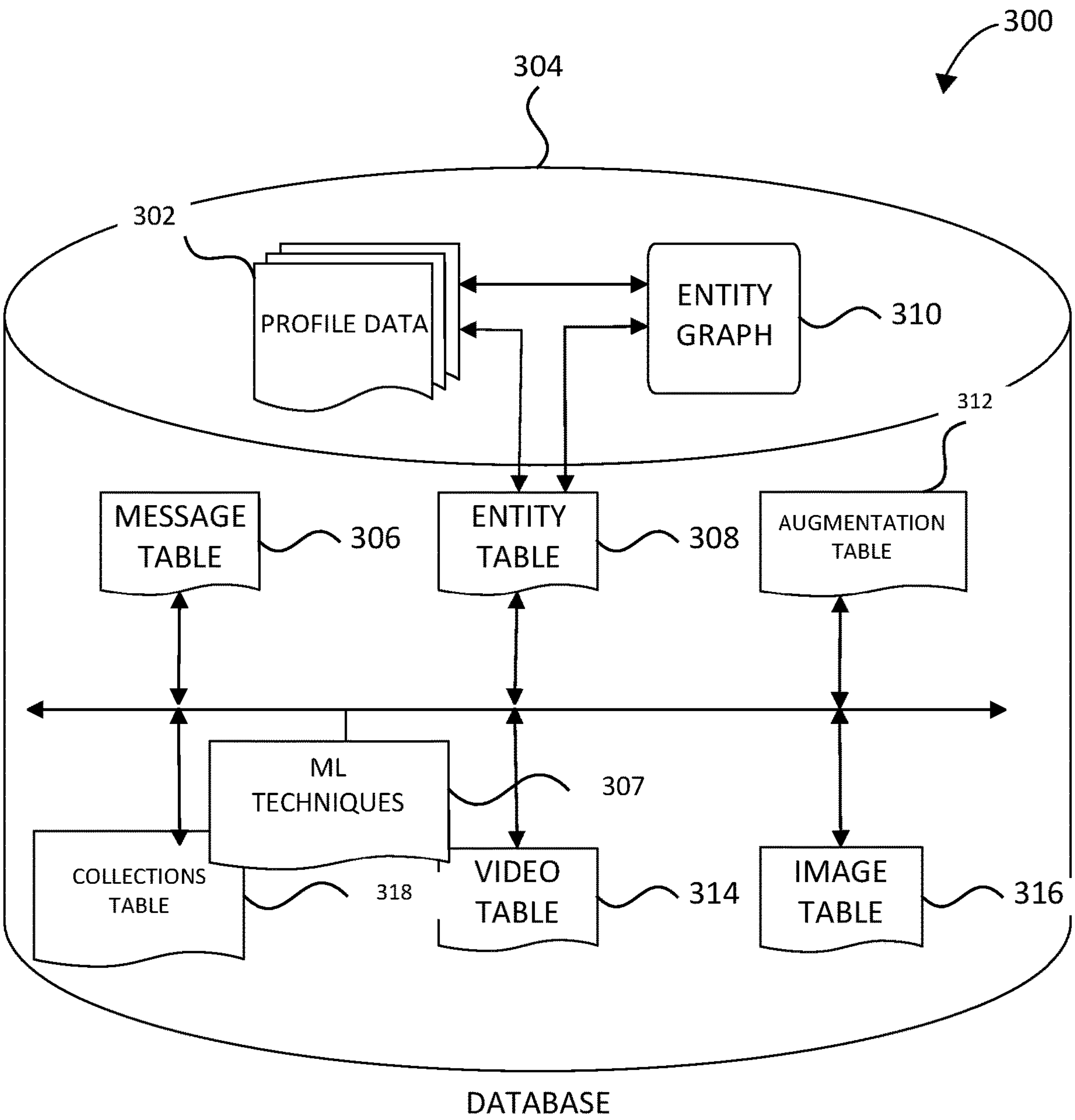
FIG. 3 is a diagrammatic representation of a data structure as maintained in a database, according to some examples.

A user management system 218 is operationally responsible for the management of user data and profiles, and maintains entity information (e.g., stored in entity tables 308, entity graphs 310, and profile data 302 of FIG. 3) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the UI of the interaction client 104. The collection management system 220 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content. Any content item in the collection of content is sometimes referred to as a "memory."

A map system 222 provides various geographic location (e.g., geolocation) functions and supports the presentation of map-based media content and messages by the interaction client 104. For example, the map system 222 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., 2D avatars of users with or without different avatar characteristics). As another example, external resources that include small-scale versions of applications (e.g., web-based versions of applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An AI and ML system 230 provides a variety of services to different subsystems within the interaction system 100. For example, the AI and ML system 230 operates with the image processing system 202 and the camera system 204 to analyze images and extract information such as objects, text, or faces. This information can then be used by the image processing system 202 to enhance, filter, or manipulate images. The AI and ML system 230 may be used by the augmentation system 206 to generate augmented content, XR experiences, and AR experiences, such as adding virtual objects or animations to real-world images.

The communication system 208 and messaging system 210 may use the AI and ML system 230 to analyze communication patterns and provide insights into how users interact with each other and provide intelligent message classification and tagging, such as categorizing messages based on sentiment or topic. The AI and ML system 230 may also provide chatbot functionality to message interactions 120 between user systems 102 and between a user system 102 and the interaction server system 110. The AI and ML system 230 may also work with the audio communication system 216 to provide speech recognition and natural language processing capabilities, allowing users to interact with the interaction system 100 using voice commands. The AI and ML system 230 may also provide personalized AI agent system 232 functionality to message interactions 120 between user systems 102 and between a user system 102 and the interaction server system 110.

In some cases, the AI and ML system 230 can implement one or more ML models that process a profile of a user to determine sharing patterns or criteria for the user. The AI and ML system 230 uses the sharing patterns to process a collection of previously captured content items (e.g., memories) to select a subset of content items that are most likely to be interesting for the user to share. Then, the AI and ML system 230 automatically analyze each content items in the subset to generate one or more augmentations or modifications unique for each content item. The modifications and/or augmentations can be selected based on derived preferences of the user and/or based on augments and modifications that the user is determined to have made to other content items that were previously shared with other users. In some cases, the modifications are made based on suggested modifications generated by one or more LLMs. After modifying the content items, the AI and ML system 230 can generate a shareable content items feed for presentation to the user (automatically or in response to a specific request). Each content item in the shareable content item feed can be presented individually in full screen or partial screen sequentially in an automated or semi-automated manner. Once a particular content item of interest is found in the shareable content item feed that is presented to the user, input can be received requesting that the particular content item of interest be shared with one or more other users.

In some cases, content items that are included in the content item feed can include an indicator that is overlaid persistently or temporarily over the content item. The indicator can represent to a user or consumer that the content item being viewed or consumed was at least partially generated automatically by the AI and ML system 230. The indicator can be a specific graphical element or text.

In some cases, the AI and ML system 230 can detect an event that is of interest to two users. For example, the AI and ML system 230 can be associated with a first user and can find an event that is relevant to a second user who is on a friends list of an account of the first user. The event can be a birthday of the second user, a life changing event (e.g., having a new addition to the family, moving from one city or home to another city or home, and/or an anniversary of a date that the first user became friends with the second user (e.g., an anniversary of when the first user added the second user to the friends list of the first user)). In response to detecting such an event, the AI and ML system 230 can generate a prompt for an LLM to suggest multiple scenarios representing the event in a fun, satirical, and/or humorous manner. Based on one of the suggested scenarios (which can be selected at random), the AI and ML system 230 can then identify and/or generate an image that depicts either the first user alone or the first user together with the second user for the first user to share (send to) the second user.

Broadly, ML may involve using computer algorithms to automatically learn patterns and relationships in data, potentially without the need for explicit programming to do so after the algorithm is trained. Examples of ML algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific ML algorithms that may be deployed, according to some examples, include logistic regression, which is a type of supervised learning algorithm used for binary classification tasks. Logistic regression models the probability of a binary response variable based on one or more predictor variables. Another example type of ML algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of ML algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of ML algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

Although several specific examples of ML algorithms are discussed herein, the principles discussed herein can be applied to other ML algorithms as well. Deep learning algorithms such as CNNs, RNNs, and transformers, as well as more traditional ML algorithms like decision trees, random forests, and gradient boosting, may be used in various ML applications. Generating a trained ML program, such as AI and ML system 230, may include multiple types of phases that form part of the ML pipeline, including, for example, the following phases:

- Data collection and preprocessing: This may include acquiring and cleaning data to ensure that it is suitable for use in the ML model. Data can be gathered from user content creation and labeled using a ML algorithm trained to label data. Data can be generated by applying a ML algorithm to identify or generate similar data. This may also include removing duplicates, handling missing values, and converting data into a suitable format.
- Feature engineering: This may include selecting and transforming the training data to create features that are useful for predicting the target variable. Feature engineering may include (1) receiving features (e.g., as structured or labeled data in supervised learning) and/or (2) identifying features (e.g., unstructured or unlabeled data for unsupervised learning) in training data.
- Model selection and training: This may include specifying a particular problem or desired response from input data, selecting an appropriate ML algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation: This may include evaluating the performance of a trained model (e.g., the trained ML program) on a separate testing dataset. This can help determine if the model is overfitting or underfitting and if it is suitable for deployment.

Prediction: This involves using a trained model (e.g., trained ML program) to generate predictions on new, unseen data.

Validation, refinement, or retraining: This may include updating a model based on feedback generated from the prediction phase, such as new data or user feedback.

Deployment: This may include integrating the trained model (e.g., the trained ML program) into a larger system or application, such as a web service, mobile app, or Internet of Things (IoT) device. This can involve setting up APIs, building a UI, and ensuring that the model is scalable and can handle large volumes of data.

Prior to the training phase, feature engineering is used to identify features. This may include identifying informative, discriminating, and independent features for the effective operation of the trained ML program in pattern recognition, classification, and regression. In some examples, the training data includes labeled data, which is known data for pre-identified features and one or more outcomes.

Each of the features may be a variable or attribute, such as individual measurable property of a process, article, system, or phenomenon represented by a data set (e.g., the training data). Features may also be of different types, such as numeric features, strings, vectors, matrices, encodings, and graphs, and may include the data obtained from the multimodal memory 508 shown in FIG. 5. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location, or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases, the ML pipeline uses the training data to find correlations among the features that affect a predicted outcome or prediction/inference data. With the training data and the identified features, the trained ML program is trained during the training phase during ML program training. The ML program training appraises values of the features as they correlate to the training data. The result of the training is the trained ML program (e.g., a trained or learned model).

Further, the training phase may involve ML, in which the training data is structured (e.g., labeled during preprocessing operations), and the trained ML program implements a relatively simple neural network capable of performing, for example, classification and clustering operations. In other examples, the training phase may involve deep learning, in which the training data is unstructured, and the trained ML program implements a deep neural network that is able to perform both feature extraction and classification/clustering operations. The neural network includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network operationally computes a small function, such as an activation function, that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network may also be one of a number of different types of neural networks or a combination thereof, such as a single-layer feed-forward network, a Multilayer Perceptron (MLP), an Artificial Neural Network (ANN), a RNN, a Long Short-Term Memory Network (LSTM), a Bidirectional Neural Network, a symmetrically connected neural network, a Deep Belief Network (DBN), a CNN, a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

The neural network can be iteratively trained by adjusting model parameters to minimize a specific loss function or maximize a certain objective. The system can continue to train the neural network by adjusting parameters based on the output of the validation, refinement, or retraining block, and rerun the prediction on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network even after deployment of the neural network. The neural network can be continuously trained as new data emerges, such as based on user creation or system-generated training data.

In some examples, the trained ML program, such as personalized AI agent system 232, may be a generative AI model. Generative AI is a term that may refer to any type of AI that can create new content from training data. For example, generative AI can produce text, images, video, audio, code, or synthetic data that are similar to the original data but not identical. In some cases, generative AI can include or implement LLMs. The generative AI and/or LLMs receive a prompt (including instructions) along with a set of data to process based on the prompt. The generative AI and/or LLMs process the data in accordance with the instructions of the prompt and generate an output that includes modifications of the set of data based on prior knowledge of the generative AI and/or LLMs.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis.
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
- Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data that is output include trend assessment and predictions, translations, summaries, image or video recognition and categorization, natural language processing, face recognition, user sentiment assessments, advertisement targeting and optimization, voice recognition, or media content generation, recommendation, and personalization.

A personalized AI agent system 232 provides personalized features to a user of an interaction client 104 by analyzing user data and behavior to understand their preferences and interests. By utilizing ML algorithms and data analytics, the personalized AI agent system 232 can learn and adapt to inferences of the user, and then generatively suggest content relevant, specific, and custom tailored to the user. For example, the personalized AI agent system 232 can use the learned preferences and inferences of the user to identify which content items in a collection of content items the user may be most interested in sharing. For example, the personalized AI agent system 232 can use the learned preferences and inferences of the user to identify which events associated with the user's friends on a friends list may be important for the two users to discuss and share content about. The personalized AI agent system 232 can also select and/or generate augmentations to enhance the identified content items to create unique experiences and sharable content items. The personalized AI agent system 232 can analyze data from multiple sources, such as various user systems 102, messages, profile information, external data sources, image data captured in real-time by a camera of the user system 102, and/or any combination thereof to generate content items (e.g., code and/or prompts) in real time and provide such content items to the user and to base the selection of the content items to be shared and modifications to the content items to be shared.

The personalized AI agent system 232 tracks user activity, such as the posts (content items) the users like, share, or comment on; the topics the users follow; the people the users connect with; and the time the users spend on the platform. Tracking performed by the personalized AI agent system 232 is only enabled if the user opts into the experience of receiving real-time generated content item modifications. The personalized AI agent system 232 can present to the user a full list of all activity and information that will be tracked and used to generate real-time content item modifications and/or suggested scenarios for use in generating or selecting content items to share. Only after receiving confirmation from the user that the user approves having such activity and information tracked does the personalized AI agent system 232 begin collecting such data and using such data to provide and generate the real-time and on-the-fly content item modifications/suggestions for presentation to the user.

The personalized AI agent system 232 can retrieve data from multiple data sources, such as activity on a user's mobile phone, an AR/VR device, a smart watch, a laptop, or other user device. Based on this information, the personalized AI agent system 232 can identify patterns and predict users' interests to generate a multimodal memory for a particular user. The personalized AI agent system 232 analyzes the user's profile information, such as their age, gender, location, messages exchanged, and/or interactions performed on the user system 102 to provide personalized features. In some examples, the personalized AI agent system 232 suggests events and groups that are nearby, or recommends job opportunities that match the user's qualifications. The personalized AI agent system 232 can generate real-time AR experiences and/or message content relevant to current circumstances and/or a real-world environment perceived by the user.

Moreover, the personalized AI agent system 232 analyzes the content that the user creates, and suggests the best time to post, the optimal hashtags to use, and the type of content that receives the most engagement. By doing so, the personalized AI agent system 232 helps the user increase their visibility and reach a wider audience. In this way, the personalized AI agent system 232 can assess data from different devices to provide personalized features through a variety of different devices. The personalized AI agent system 232 provides such personalized features automatically in real time based on the multimodal memory associated with the user and in the communication channel for the particular content that is preferred by the user. Analyzing user data and behavior to understand their preferences and interests, and then suggesting and generating content items that are relevant to the users, not only enhances the user experience but also increases engagement and retention rates on the platform.

In some examples, the personalized AI agent system 232 detects, by an interaction system 100 associated with a first user (e.g., user system 102), an event associated with a second user and generates a prompt that includes the event and a request for a plurality of scenarios that are relevant to the event. The personalized AI agent system 232 processes the prompt by a LLM to generate the plurality of scenarios that are relevant to the event and presents an individual content item corresponding to an individual scenario of the plurality of scenarios, such as for inclusion in a content item feed and/or sharing with the second user (who may be friends with the first user).

Data Architecture

FIG. 3 is a schematic diagram illustrating data structures 300, which may be stored in a database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), and a user-selected avatar representation (or collection of such avatar representations). A particular user may then selectively include one or more of these avatar representations within the content of messages communicated via the interaction system 100 and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a UI by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time. Each filter can be associated with various metadata that describes the filter. Such metadata can include one or more keywords descriptive of the filter.

Other augmentation data that may be stored within the image table 316 includes AR content items (e.g., corresponding to applying "lenses" or XR experiences). An XR content item (e.g., XR object) may be a real-time special effect and sound that may be added to an image or a video. Any discussion with respect to XR content and/or XR experiences and XR application can be similarly applied to AR and VR content, experiences and/or applications.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the UI of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained ML techniques 307 that stores parameters of one or more ML models that have been trained during training of the shareable content item feed system 590 (FIG. 5) and/or the personalized AI agent system 232 (FIG. 2). For example, trained ML techniques 307 stores the trained parameters of one or more artificial neural network ML models or techniques.

Data Communications Architecture

Figure 4:
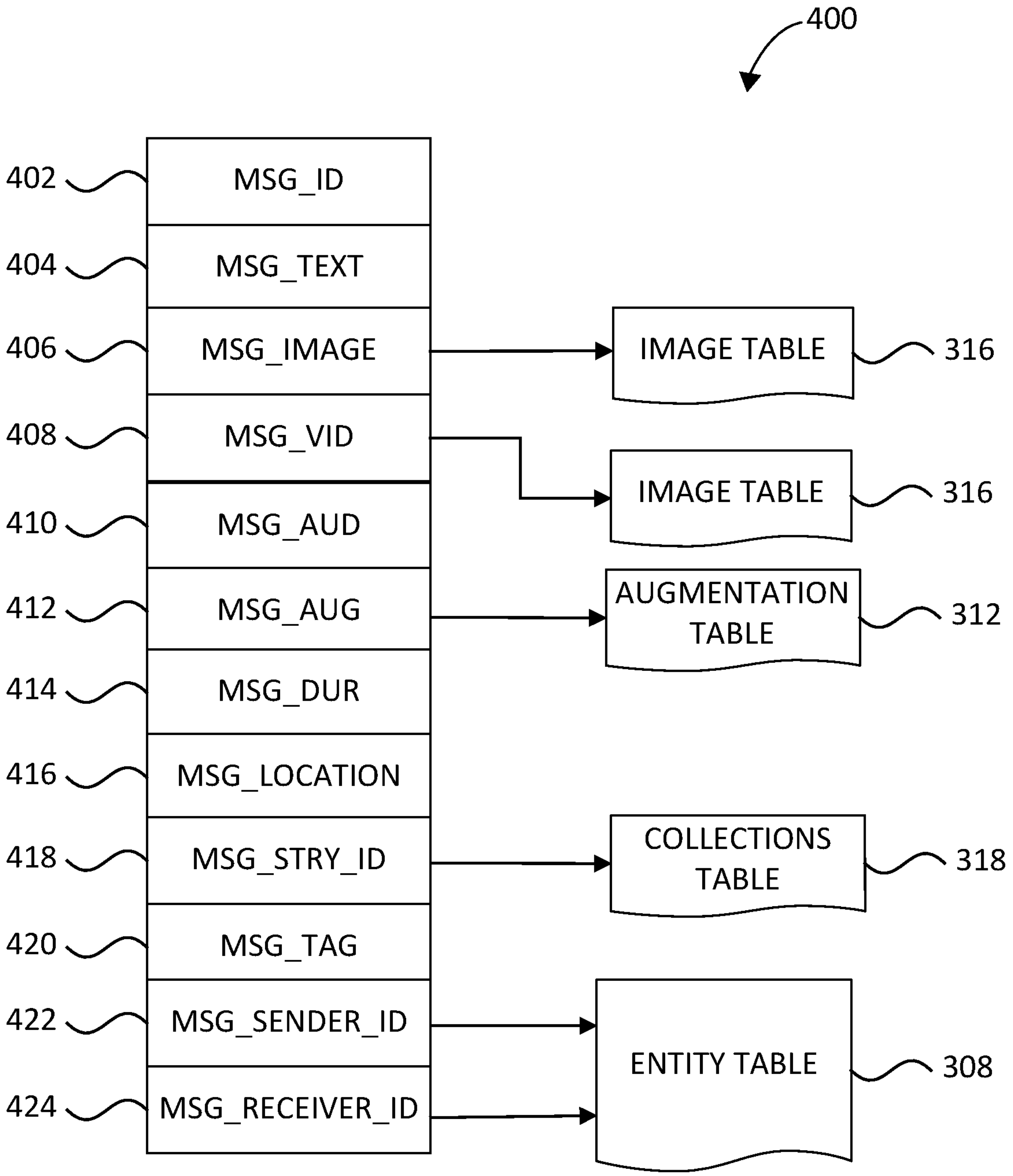
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a UI of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Personal AI Agent System

Figure 5:
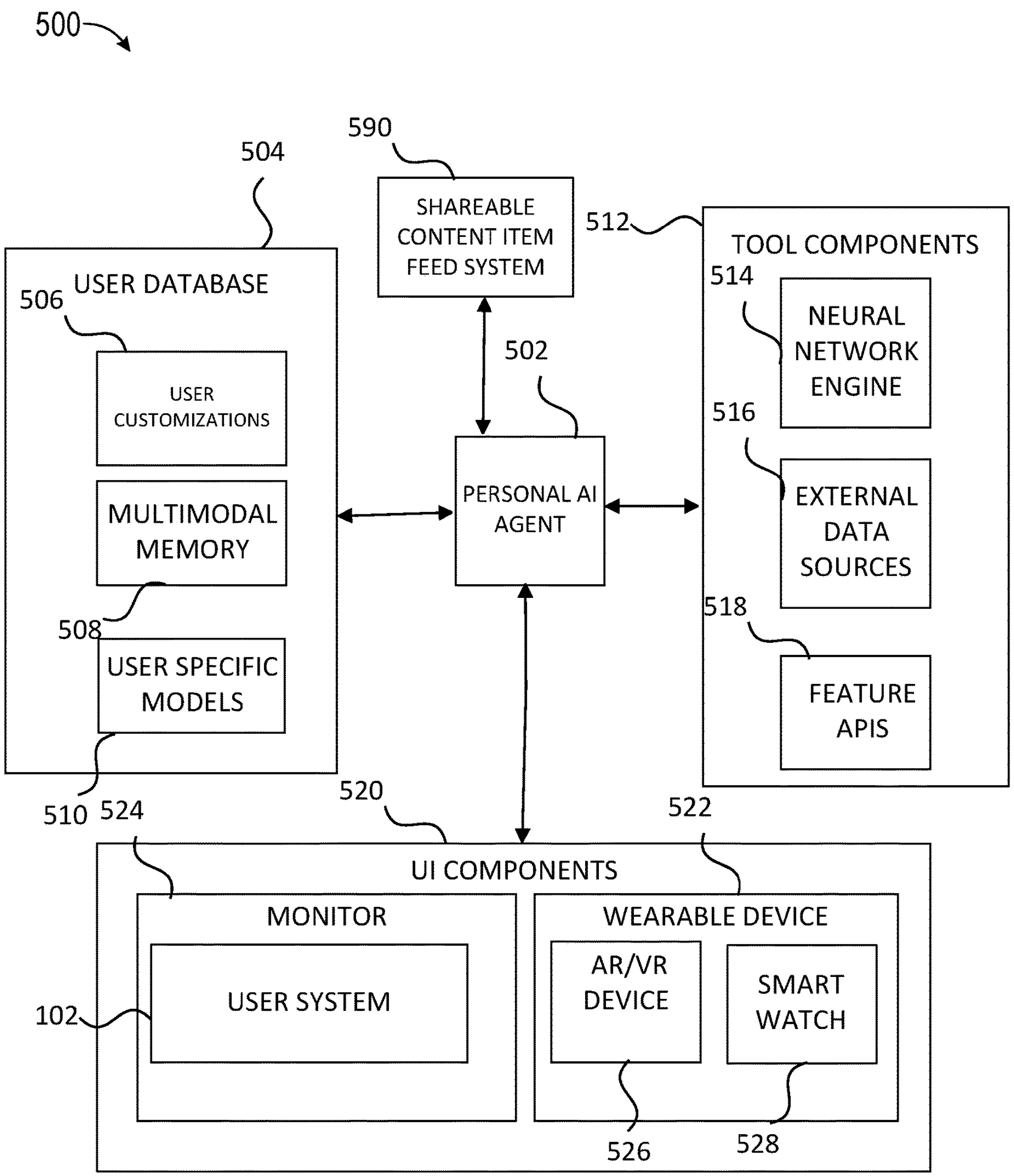
FIG. 5 illustrates an example architecture for applying a personalized personal artificial intelligence (AI) agent to generate sharable content items, according to some examples.

FIG. 5 illustrates an example architecture 500 for applying a personal AI agent 502 to identify relevant features that are personalized for a user. The example architecture 500 can include a personal AI agent 502, a user database 504, tool components 512, a shareable content item feed system 590, and UI components 520. The personal AI agent 502 implements one or more ML models that communicate with user database 504, UI components 520, and the tool components 512 to selectively and intelligently generate modified content items for a user to share or for inclusion in a sharable content item feed.

The user database 504 includes user customizations database 506, a multimodal memory 508, and user specific models 510. In some cases, the personal AI agent 502 collects data from various sources and generates a multimodal memory 508 specific to a particular user. The personal AI agent 502 then provides personalized features to the user based on the identity model captured in the multimodal memory 508.

The multimodal memory 508 stores information pertinent to a user. Any of the data collected and stored in the multimodal memory 508 is collected and stored with express permission from the user on an opt-in basis. Non-limiting examples of multimodal memory types include:

- Demographic data: information such as age, gender, location, income, education, and occupation.
- Behavioral data: information about an individual's actions and interactions with a website, application, VR device, or other digital touchpoints. This data can include website visits, clicks, downloads, purchases, and user interaction with other users. Content items the user shares with other users.
- Psychographic data: information about an individual's personality.
- Contextual data: information about the time, location, and device used by an individual when interacting with digital touchpoints. This data can help the personal AI agent 502 to understand the context of the interaction and personalize the experience accordingly.
- Purchase history data: information about an individual's past purchases, such as products bought, frequency of purchases, and purchase amounts. This data can be used by the personal AI agent 502 to create personalized recommendations and offers. Data can also include advertisement interaction data that includes user's interactions with advertisements such as clicks, impressions, and conversions.
- Interests data: information about an individual's hobbies, interests, and passions, which can be collected through online posts and activities.
- Communication data: information about how an individual prefers to be contacted and their communication history with other users. This data can be used to personalize communication channels and messaging (e.g., SMS message on phone or pop-up message on AR device).
- Data from augmentation devices (such as AR/VR devices): information from a camera feed that the user uses to capture images or videos of the user's surroundings, selections of digital content items, such as augmentations or overlays used on the camera feeds, biometric data such as heart rate, body temperature, facial expressions, and/or the like, user's preferred interaction methods on the AR device, types/duration of AR interactions, eye tracing, eye focus, and gaze direction for where users are looking and for how long, body movements such as head or body motions, gestures, or interactions with the virtual environment, hand and finger movements using controllers or tracking devices, audio data from a microphone, user emotional responses such as heart rate, skin conductance, or facial expressions, user cognitive performance such as attention, memory, or problem-solving skills, and/or the like. Types of augmentations applied to content items that the user shares with other users.
- Contacts and connections data: data about a user's contacts and connections, including their friends, followers, and groups.
- Device data: information about the user's device, including the type of device, operating system, and browser, which can be used to optimize the platform's performance and to provide a seamless experience across different devices.

The personal AI agent 502 links different aspects of a user profile into a multimodal memory 508. The multimodal memory 508 stores various aspects of a user (e.g., users' preferences, life styles, interest, friends) and can use this contextual information later on to create custom tailored content, such as based on events associated with the friends of the user. The value of such custom-tailored content increases over time and across other form factors as the personal AI agent 502 collects more data related to the user. With more and more digital touchpoints from the user as time progresses, the personal AI agent 502 gains a much deeper understanding of the user and can use historical context to find relevancy in any current user activity.

Multimodal memory 508 includes entity-based memory, which refers to memory that is focused on specific things, such as objects, people, places, events, and experiences. This aspect of multimodal memory 508 stores information about the attributes, features, and characteristics of these specific objects or people, such as remembering the name of a person, their appearance, their occupation, or their interests. Multimodal memory 508 also includes a knowledge graph memory, which refers to memory that is focused on how things are related or connected to each other. This aspect of the multimodal memory 508 organizes information in a structured way, where entities are linked together based on their relationships and attributes in a weighted manner. Knowledge graph memory helps the personal AI agent 502 understand the context and meaning of information by showing how different entities and concepts are related. For example, the knowledge graph can store associations indicating what objects (e.g., animals) a user likes and what objects (e.g., food items) a user dislikes. The knowledge graph can store associations indicating what words/phrases/augmentations a user applies to images that contain or depict items a user likes and what words/phrases/augmentations a user applies to images that contain or depict items a user dislikes.

Each entity in the multimodal memory 508 can be linked to each other entity. The links between these entities can be weighted in different manners to represent how closely related the entities are to each other. For example, an entity representing a dog name can be linked to an entity for the user and to an entity representing animals, whereas another entity representing a human with the same name can be linked to the entity for the user and another entity representing contacts of the user. The entity representing the dog name can be linked with a greater weight to the entity for the animal than the link between the entity representing the human with the same name and the entity for the animal. Similarly, the entity representing the human with the same name as the dog can be linked with a greater weight to the entity for the contacts than the link between the entity representing the dog name and the entity for the human. In this way, a variety of information about a given user or individual or organization can be collected and related to establish links between the information.

In some cases, the entity-based memory is focused on specific things, while the knowledge graph memory is focused on how things are related. Entity-based memory stores information about individual entities, while knowledge graph memory organizes information based on the relationships and connections between entities. Both types of memory can be used to learn and understand the current context associated with one or more users.

The personal AI agent 502 uses embeddings for the multimodal memory 508, which refers to a technique used in ML to represent and store data from multiple modalities (such as images, text, and audio) in a common vector space. The purpose of embeddings is to capture the semantic meaning and relationships between different modalities, allowing for more efficient and accurate processing of multimodal data. In some examples, the personal AI agent 502 feeds the knowledge graph to an external or internal process to generate the latent embeddings. The personal AI agent 502 stores the latent embeddings in the multimodal memory 508 for use in generating the on-the-fly content recommendations and analysis. In some cases, the content recommendations are provided to the user system 102 without the user issuing a specific request for the content recommendations. For example, the user system 102 is used to capture or access an image and the personal AI agent 502 detects the image being viewed by the user system 102. The personal AI agent 502 leverages the user database 504 to generate a specific AR experience and can automatically apply the generated AR experience on the image currently being accessed or viewed by the user system 102. In some cases, the personal AI agent 502 uses the tool components 512 (discussed below) to generate the unique AR experience to provide and activate the AR experience on the user system 102.

The personal AI agent 502 uses these embeddings for cross-modal comparisons and analysis. In some examples, an embedding of an image is compared to the embedding of a corresponding text description to identify semantic relationships between the two. In the context of the multimodal memory 508, embeddings are used to store and retrieve information from different modalities in a more efficient and effective manner. In some examples, if a user has stored an entity (e.g., a memory object) that includes an image, text description, and audio recording, embeddings can be used to represent each of these modalities in a common vector space. This allows for the efficient retrieval and integration of information from multiple modalities when accessing the memory object.

The personal AI agent 502 generates embeddings using one or more techniques, such as neural networks. These embeddings can be fine-tuned and optimized for specific applications and tasks. The personal AI agent creates embeddings for the multimodal memory that include information about individuals and their relationships with other individuals, entities, and devices and are generated using various data sources as described herein by identifying patterns and connections between entities. As such, the personal AI agent 502 can apply the multimodal memory for the user in a variety of different ways to provide personalized features for the user.

Users in the past may have selected certain customization options, such as content augmentations, graphics, or features within an application or AR device. The interaction system 100 stores such customizations of the user in a user customizations database 506. The personal AI agent 502 uses such customizations in providing relevant content, such as by identifying preferences of customizations of the user. In some examples, the user may have used a certain type of augmentation (e.g., adding pizza to camera feeds) or stickers that the user sends to friends.

The user customizations database 506 includes customizations made by the user within the interaction system 100. The user customizations database 506 stores profile customization (e.g., profile picture, cover photo, and introduction), news feed preferences (e.g., prioritizing certain friends, pages, and groups), and privacy settings (e.g., who can see posts, profile information, and activity). The user customizations database 506 stores personalized avatar and sticker selection, customized content augmentations and how these were applied to a camera feed, sound and music preferences for content creation, subscription preferences for channels and creators, and other types of user customizations based on user's viewing history and engagement.

The user specific models 510 include generative models for generating graphics, text, and images for the user. For example, the user specific models 510 can generate stickers that include photographs, graphics, or animations. The user specific models 510 generate avatars that represent users on the interaction system platform. Users can customize avatars to reflect the user's appearance, personality, and interests. The user specific models 510 generate filters and content augmentations, such as XR effects that can be applied in real-time, to enhance photos and videos. The user specific models 510 generate memes to share humorous images, videos, and captions that convey a specific cultural idea or trend. The user specific models 510 generate hashtags to categorize and organize user posts based on a particular theme or topic, which allow users to connect with other users who share similar interests or to participate in trending conversations. The user specific models 510 generate short-lived photos and videos that can be viewed by their followers for a limited time, which include filters, stickers, and text overlays to make them more engaging.

The tool components 512 includes one or more neural network engines 514, one or more external data sources 516, and one or more feature APIs 518. The neural network engine 514 includes one or more generative ML models. The generative ML models can be trained to generate a variety of different content. For example, the generative ML models are trained to receive a prompt as input (which can include any combination of text, images, audio, and/or videos) and generate an output that responds to the prompt. In some cases, the generative ML models generate an artificial image/video, code segments, and/or text that is responsive to the prompt. In some cases, the generative ML model generates content augmentations, such as filters that can overlay, modify, or augment a real-world camera feed with digital content items or content items that were previously captured. The tool components 512 can include a filter tool, a caption tool, and/or an image-to-image tool. The caption tool (or add caption tool) can be used for adding a caption to an individual content item, the image-to-image tool can be used for processing an individual content item by a generative model to generate a new content item according to a description, and the filter tool can be used for selecting a predefined filter matching one or more keywords to apply to the individual content item.

In some cases, the personal AI agent 502 provides, as input to the neural network engine 514, a prompt that is generated by the personal AI agent 502 based on information gathered from the UI components 520 (representing a current real-world environment) and user database 504. Namely, the personal AI agent 502 generates a prompt that includes an image captured by the user system 102 and one or more vectors derived from the multimodal memory 508. This prompt can be provided as input to the neural network engine 514. The neural network engine 514 then accesses additional sources of data, such as external data sources 516 and/or feature APIs 518, to generate content that matches the inputs of the prompt. In some examples, the personal AI agent 502 collects contextual data of a conversation, hears audio from the user, and/or receives some other input from the user or the user's environment and generates a request for the neural network engine 514.

The external data sources 516 can include various search engines, chat bots, email applications, calendar applications, messaging applications, social network applications, news sources, live media sources, and/or any combination thereof. The personal AI agent 502 accesses external data from external data sources 516 to generate and/or apply multimodal memory 508 for a user. In some examples, the personal AI agent 502 collects user data in different media types and creates embeddings for the user's multimodal memory 508. The personal AI agent 502 can retrieve data from external data sources 516 to apply to multimodal memory 508 and/or to use in generating the input for the neural network engine. The external data sources 516 can include any combination of a repository of scientific papers that include content information about the papers, title, author, abstract, keywords, and citations; data from emails, such as email addresses, contact lists, email content, attachments, and metadata (such as timestamps and Internet Protocol (IP) addresses); search engine data, such as search queries, search history, location data, device information, and web activity; and/or communication data, such as messages, voice and video calls, roles in group messages, posts, comments, votes, user subscriptions, likes, followers, and hashtags.

The neural network engine 514 can intelligently select one or more of the external data sources 516 to populate data to respond to the prompt received from the personal AI agent 502. The feature APIs 518 can provide access to a variety of different additional tools which may be proprietary. Using a given one of the APIs from the feature APIs 518, the neural network engine 514 can access additional ML tools to generate additional content. For example, one of the proprietary tools can include an AR experience generation tool. The neural network engine 514 can access the API of this tool to prompt the tool to generate an AR experience having specific features generated by the neural network engine 514 based on the prompt received from the personal AI agent 502. The neural network engine 514 can receive the specific AR experience and can further apply various effects and modifications to the AR experience in order to generate a response to the personal AI agent 502 that includes the AR experience matching the prompt. The personal AI agent 502 can then automatically augment and/or modify the image currently being presented on the user system 102 using the unique AR experience generated by the neural network engine 514.

The personal AI agent 502 retrieves the personalized content for the user and applies the content through various feature APIs 518. The personal AI agent 502 applies the personalized and/or recommended content to interaction client features via the feature APIs 518 including a photo, video, or podcast that a user captures and shares with friends. The personal AI agent 502 recommends filters, stickers, text overlays, or content augmentation effects applied to a camera feed that can be then recorded and sent to individual users. The personal AI agent 502 applies the personalized and/or recommended content to interaction client features via the feature APIs 518 including messages, photos, and videos to individual friends or to groups; collection of photos or videos, such as a collection that can be viewed by friends for up to a certain time period (e.g., 24 hours); content from media partners, such as news articles, videos, and shows that are custom-curated for the user; map-related features, such as when and who to share locations with, how the system shares and what information is displayed on the map UI; filters and/or XR experiences that include visual overlays applied to photos or video, such as adding location-based information, temperature, time, and other graphics; and customized avatars that can be used in photos/video, chat messages, and in other features.

In many cases, multiple input devices can be accessed by the personal AI agent 502 to generate the prompt for the neural network engine 514. These input devices or combination of input devices can include a wearable device 522 such as an AR/VR device 526, a device with a monitor 524 such as a user system 102, and/or a smart watch 528. The outputs generated by the personal AI agent 502 can be provided to any one of the same or different combinations of the AR/VR device 526, a user system 102, and/or a smart watch 528. The personal AI agent 502 identifies the preferred method of communication using the multimodal memory 508. In some examples, the personal AI agent 502 identifies that the user likes to be reminded via the smart watch 528, given directions on the AR/VR device 526, and receives text messages on the user's mobile phone.

The process for training the neural network engine 514 can be the same as previously discussed. The neural network engine 514 can receive a collection of training data that includes a variety of different prompts and ground truth responses. These ground truth responses can include identification of sources of data that can be used to respond to a prompt and/or generated image content or text content that responds to the prompt. The neural network engine 514 can iterate over the training data until a loss function satisfies a stopping criterion, where at each iteration parameters of the neural network engine 514 are updated. In a similar manner, the personal AI agent 502 can be trained based on training data to generate a prompt to provide to the neural network engine 514. The training data can include a variety of latent vectors, images, and information obtained from the user database 504 and corresponding ground truth prompts. The personal AI agent 502 can iterate over the training data until a loss function satisfies a stopping criterion, where at each iteration parameters of the personal AI agent 502 are updated. In this way, the personal AI agent 502 can generate real-time prompts based on current information accessed or obtained by the UI components 520 to provide to the tool components 512 for generating content to provide back to the UI components 520.

The shareable content item feed system 590 can continuously or periodically analyze images captured by one or more interaction clients 104, such as the UI components 520. The shareable content item feed system 590 can apply one or more ML models to a collection of previously captured content items to select content items that match criteria indicating that the content items are likely to be of interest in sharing. In response to selecting the content items that match the criteria, the shareable content item feed system 590 can generate a prompt for modifying each of the selected content items individually using a different augmentation that is selected based on preferences provided by the personal AI agent 502 and/or based on objects depicted in the respective images. In some cases, the prompt is dynamically generated based on contextual cues gathered from the images and/or information objected from the multimodal memory 508.

The shareable content item feed system 590 accesses, by the interaction client 104, an XR application. The shareable content item feed system 590 can, together with and/or separate from the personal AI agent 502, provide the prompt to the tool components 512 to process the prompt using the generative ML model (e.g., the neural network engine 514) to generate revisions or augmentations for each content item that has been selected. The modified content items are then ranked and placed in a shareable content item feed, such as based on recency of capture.

The shareable content item feed system 590 can be part of the personal AI agent 502 and perform similar functions as the personal AI agent 502. The shareable content item feed system 590 can then present the shareable content item feed automatically and/or in response to input received from the user. For example, a user request to share content can be received. In response, a first content item from the shareable content item feed is presented in full screen. A gesture (such as a swipe up gesture) can be detected and, in response, the shareable content item feed system 590 retrieves and presents a second content item from the shareable content item feed in full screen. The shareable content item feed system 590 monitors interactions, such as dwell time, of the user for each content item presented in the shareable content item feed. The shareable content item feed system 590 can dynamically reprioritize and re-rank the content items in the shareable content item feed and/or retrieve and generate a new modified content for inclusion in the shareable content item feed based on the monitored interactions. Once a content item of interest is selected by the user, the shareable content item feed system 590 detects input that selects an option to share the content item. In such cases, the shareable content item feed system 590 sends the content item from the shareable content item feed to one or more designated recipients.

The personalized AI agent system 232 and the shareable content item feed system 590 provide users with opt in/opt out options to opt out of the use of user information. The personalized AI agent system 232 and the shareable content item feed system 590 can operate by default as opt-in systems. Opt-in and opt-out options are mechanisms used by the system to give users control over the use of their personal data. These options are especially significant in the era of data privacy regulations such as the General Data Protection Regulation (GDPR) and the California Consumer Privacy Act (CCPA). Below are some examples of opt-in mechanisms:

1. The Opt-in: An opt-in approach requires users to actively give their consent before their personal data can be collected, processed, or shared by the application or website. This method is considered more privacy-friendly, as it ensures that users are fully aware of the data practices and intentionally choose to participate. Such opt-in options can appear as banners or pop-ups. These appear when users first visit a website or launch an application, requesting permission to collect and process personal data for specific purposes (e.g., targeted advertising, analytics, or personalization). Other opt-in options can be displayed in the form of checkboxes or toggle switches, allowing users to enable or disable data collection for specific purposes individually. In some examples, opt-in options are shown as in-context prompts, where users may encounter these when accessing particular features or functionalities within the application or website that rely on data collection (e.g., location-based services).
2. Opt-out: In an opt-out approach, the system assumes that users consent to data collection and processing by default. However, users are provided with options to withdraw their consent at any time. The system applies the opt-out approach in a limited number of circumstances.

The system provides privacy policy or settings, where users can access an application or website's privacy policy, which includes information about how to opt out of data collection and processing, or preference options that allow users to manage their privacy settings and disable specific data collection and sharing practices. To promote transparency and user control, the systems described herein clearly communicate data collection and processing practices, and provide easy-to-use opt-in and opt-out options.

Shareable Content Item Feed System

In some examples, the shareable content item feed system 590 detects an event that is associated with a friend (e.g., a second user) who is associated with a first user of the user system 102. For example, the shareable content item feed system 590 can determine that the second user has posted an update to a status feed of the second user that is available to all friends of the second user. In some cases, the shareable content item feed system 590 does not monitor the events or status updates of all of the friends of the first user. Rather, the shareable content item feed system 590 can monitor status updates or events of a subset of friends of the first user. The subset of friends can include users/friends that are designated by the first user as "best friends." In addition or in the alternative, the subset of friends can include only users that the first user has recently exchanged messages with on a messaging platform. For example, the shareable content item feed system 590 can access a chat history representing messages exchanged between the first user and other users. The shareable content item feed system 590 can identify messages in the chat history that were exchanged in the last few days or within a previous time interval. Within those identified messages, the shareable content item feed system 590 can select for inclusion in the subset of friends only a first quantity of users (e.g., the top 10 users). This can represent users whom the first user most often and most recently communicated with.

The shareable content item feed system 590 can process text of the status feed to identify one or more keywords that represent an event. The shareable content item feed system 590 can access a list of events or event criteria to determine if the event associated with the second user matches one of the events on the list of events or matches the event criteria. In response to determining that the event associated with the second user matches one of the events on the list of events or matches the event criteria, the shareable content item feed system 590 initiates the process of suggesting sharable content items to the first user (e.g., the process discussed in connection with FIG. 10 below).

In some cases, the shareable content item feed system 590 conditions initiating the process of suggesting, to the first user, sharable content items relating to the second user on one or more factors. For example, the shareable content item feed system 590 can determine whether the first user and the second user are within a threshold proximity of each other. To do so, the shareable content item feed system 590 can access location information associated with the first user (if allowed to be shared by the first user) and access location information associated with the second user (if allowed to be shared by the second user). The shareable content item feed system 590 determines if the distance between the location information associated with the first user and the location information associated with the second user is greater than (or less than) a location threshold. If so, the shareable content item feed system 590 continues to initiate the process of suggesting the sharable content items to the first user.

In response to detecting the event associated with the second user (and if the above conditions for suggesting sharable content items are met), the shareable content item feed system 590 can generate a prompt 600, as shown in FIG. 6, for an LLM to generate a plurality of scenarios representing the event. The prompt 600 can include a current date; information about the first user, including a location of the first user; information about the second user; and details about the event and a request for a plurality of scenarios to represent the event. Each of the plurality of scenarios can include information about who is in a respective scenario, a pose or activity performed by each person present in the respective scenario, an expression of each person present in the respective scenario, and a description of a background of the respective scenario and can optionally include a message for a caption. Specifically, the prompt 600 can include instructions to include a message about fear of missing out (FOMO) in response to a location of the first user being greater than a threshold distance of a location of the second user.

Specifically, the prompt 600 can include an instruction 610 to inform or request the LLM to create share-worthy scenarios representing the event associated with the second user given a set of input criteria including a current date, information about the first user (e.g., user of the user system 102), information about the second user, and information about the event. The information about the first user can include a username or user identifier of the first user and an avatar of the first user. The information about the second user can include a username or user identifier of the second user and an avatar of the second user.

The instruction 610 can request the LLM to take an event or update about the second user who is a friend of the first user and to describe a plurality (e.g., five) of dynamic scenarios or circumstances that reference the event. The instruction 610 can instruct the LLM to consider distance from the current date if relevant. The instruction 610 can request the LLM to generate the scenarios or circumstances to be fun to share to the second user and featuring either the first user alone or the first user together with the second user. If the first user is not physically near the second user, the instruction 610 instructs the LLM to generate a message to accompany an image speaking to FOMO. The instruction 610 instructs the LLM to describe the scenario or scene with unique details that are relevant with qualifying attributes that hint at style or aesthetic and detail the event or activity. The instruction 610 can instruct the LLM to avoid generating content that fails to meet safety criteria (e.g., prevent generating suggested scenarios that are not safe for work (NSFW)). The instruction 610 can specify that the description of the scenario should be limited to less than a threshold number of characters (e.g., less than 150 characters) and should include words describing the framing, details of facial expressions, poses, outfits, and so forth. The instruction 610 can instruct the LLM to exclude scenes that mask the eyes or cover faces. The instruction 610 can instruct the LLM to generate expressions for each participant making the moment shareable, such as by smirking, winking, laughing, crying, mad, confused, eyes closed, smiling or laughing with the tongue out.

In cases of generating a message for a caption, the instruction 610 can specify for the LLM to provide a plaintext caption to add to the content item that is clever, funny, satirical, sarcastic, and/or resonates with someone who is within a certain age range (which can correspond to the age of the user of the user system 102). The instruction 610 can indicate that the message should be kept short and funny and should be written in English. The instructions for the message can instruct the LLM to add a specified graphical element to a front of the text of the caption and at the end of the text. The specified graphical element represents to a user that the caption was generated automatically.

The prompt 600 can include an instruction 630 to the LLM to return a predetermined number of suggested scenarios (e.g., five suggested modifications). The instruction 630 can instruct the LLM to structure each suggested modification according to a specified format 620. The specified format 620 can be in a JSON or HTML or other markup language format. For scenarios that depict only a single person, the specified format 620 can include a field for a description of the scenario, a field for a username or user identifier of a first person being depicted, a field for participant details of the first person (e.g., describing an outfit, accessories, hairstyle, and so forth), a field for an expression of the first person, and optionally a field for a message for an image caption. For scenarios that depict first and second persons, the specified format 620 can include a field for a description of the scenario, a field for a first username or first user identifier of the first person being depicted, a field for participant details of the first person (e.g., describing an outfit, accessories, hairstyle, and so forth), a field for an expression of the first person, a field for a second username or second user identifier of the second person being depicted, a field for participant details of the second person (e.g., describing an outfit, accessories, hairstyle, and so forth), a field for an expression of the second person, and optionally a field for a message for an image caption.

The shareable content item feed system 590 can process the prompt 600 by providing the prompt 600 to an LLM. The shareable content item feed system 590 can generate an output 700, shown in FIG. 7, based on the LLM processing the prompt 600. For example, the output 700 can include multiple suggested scenarios for a sharable content item. The suggested scenarios can include a first suggested scenario 710, a second suggested scenario 720, and a third suggested scenario 730. Each suggested scenario can include a different set of descriptions for an image and identification of persons to include in the image along with an optional message/caption to overlay on the image, such as by adding a sticker.

For example, the first suggested scenario 710 can include an image description field that describes a scene (e.g., a close-up selfie of a man wearing a black leather jacket posing in front of a Hollywood sign) and a set of descriptions of a participant to depict in the image along with a message 718 to add as an overlay on the image, such as using a sticker. The set of descriptions of the first suggested scenario 710 can include an identifier 712 of the participant (e.g., a user identifier or username of the first user), description 714 of a pose and outfit that the participant is wearing, and an expression 716 for the participant. The second suggested scenario 720 can include an image description field 721 that describes a scene (e.g., a close up selfie of a man and a woman posing in front of the Eifel tower), a first set of descriptions 722 of a first participant to depict in the image, a second set of descriptions 724 of a second participant to depict in the image, and a message 728 to add as an overlay on the image, such as using a sticker. The second set of descriptions 724 can be the same or different from the set of descriptions provided in the first suggested scenario 710. The third suggested scenario 730 can include a different set of information than the first suggested scenario 710 and the second suggested scenario 720.

In some examples, the shareable content item feed system 590 can process the output 700 to select a particular suggested scenario to use to generate, access, or select a content item to suggest for sharing with the second user by the first user. For example, the shareable content item feed system 590 can randomly select one of the suggested modifications, such as the first suggested scenario 710.

The shareable content item feed system 590 can process fields of the selected suggested scenario to automatically or semi-automatically search for content items that match the description of the fields of the selected scenario or generate a new image that matches the description. For example, the shareable content item feed system 590 can determine that the first suggested scenario 710 includes identifier 712 of a participant to depict in a content item. In such cases, the shareable content item feed system 590 retrieves the image description and the participant details from the first suggested scenario 710.

In some examples, the shareable content item feed system 590 accesses a list of previously captured content items, such as images, pictures, videos, audio files, and so forth. The shareable content item feed system 590 may search for only those previously captured content items that are associated with timestamps that precede a current time by a threshold period. For example, the shareable content item feed system 590 can access only those content items that were captured in the last week or in the previous two days. In some cases, the shareable content item feed system 590 access all of the previously captured content items that are associated with a user and stored on the user database 504 and/or user system 102.

The shareable content item feed system 590 processes the retrieved or accessed previously captured content items using one or more ML models, such as using the personal AI agent 502. The shareable content item feed system 590 can determine which of the previously captured content items match or are associated with attributes that correspond to one or more shareable criteria. For example, the shareable content item feed system 590 can access criteria that defines content items that are good candidates to be shared with other users. The criteria can be general to the population of users of the interaction client 104 and/or specific to the user of the interaction client 104. For example, in some cases, the shareable criteria can be initially defined to include a certain category or theme of content and certain depictions of items or objects in the images. In such cases, the shareable content item feed system 590 extracts features from each of the previously captured content items that have been retrieved or accessed and determines whether the features correspond to the initially defined shareable criteria. Any content item that matches the initially defined sharable criteria can be included in a set of content items to be used to determine if it matches the suggested scenarios. This results in a collection of content items selected from the previously captured content items for inclusion in an initial set of content items to be modified.

In some cases, the shareable content item feed system 590 generates an embedding for each content item that was previously captured by the user system 102 (e.g., within a certain past time interval, such as captured in the past week). The embedding can represent tags, visual cues, and/or descriptions of each content item. In some cases, these cues, tags, and descriptions are generated by processing each content item by an LLM with a prompt requesting generation of descriptive tags for each content item. The shareable content item feed system 590 can also determine whether any content item in the list of candidate content items has been designed by a user as private. The shareable content item feed system 590 can remove such content items designed as private from the list of candidate content items. The shareable content item feed system 590 can then determine, based on the tags and visual cues of the candidate content items, whether lighting conditions meet a certain darkness threshold. If so, the shareable content item feed system 590 determines that the content items have poor lighting and removes such content items from the list of candidate content items. The filtered list of candidate content items can then be used to select individual content items for automated modifications by the shareable content item feed system 590.

In some examples, the personal AI agent 502 can process the previously captured content items based on preferences of the user to identify those content items that are most likely of interest to the user to share, such as based on a history of interactions associated with the user. Specifically, after initially generating the shareable content item feed, over time, such as over the course of days, weeks, and/or months, the personal AI agent 502 can build a profile that represents content items shared by a user of the interaction client 104. For example, after a certain quantity or number of content items have been shared by the user, the personal AI agent 502 can process the content items to extract features that represent the content items that were shared by the user. The personal AI agent 502 can then update the initially defined criteria to be more user specific. The shareable content item feed system 590 can then use the updated criteria to select a new group or collection of content items from the previously captured content items (which may now include new or additional previously captured content items).

In some examples, the criteria for selecting content items to include in a set of content items to modify can be derived or determined automatically by the personal AI agent 502. Namely, the personal AI agent 502 can use one or more generative ML models along with a prompt to generate the criteria. The prompt can instruct the generative ML models to process data including the entire collection of content items a given user has previously captured and/or accessed and obtain interests or preferences of the user. The prompt can further instruct the generative ML models to derive criteria based on the data that represents the most likely attributes of content items the user likes to share with other users. This criteria can then be used by the shareable content item feed system 590 to select a set of content items from previously captured content items to modify.

The shareable content item feed system 590 can access the set of previously captured content items to find an individual content item that matches each of the fields of the first suggested scenario 710. For example, the shareable content item feed system 590 can access visual tags associated with a recent set of content items (e.g., content items captured within the past six months) to determine whether a single person is depicted in the content item. The shareable content item feed system 590 can then determine whether an identity of the single person depicted in the content item corresponds to the visual identifiers of the first user identified by the identifier 712.

For example, the shareable content item feed system 590 can retrieve one or more images that are known to depict the first user identified by the identifier 712. The shareable content item feed system 590 can then compare facial features of the first user with facial features of the single person depicted in the identified set of content items that depict the single person. The shareable content item feed system 590 can form an additional subset of content items that only depict one person with facial features corresponding to the identity of the first user based on the comparison. The shareable content item feed system 590 can then further filter the additional subset of content items based on a pose, facial expression, and fashion items worn by the first user depicted in the additional subset of content items. Specifically, the shareable content item feed system 590 can determine whether any of the additional subset of content items depict the first user in the pose, facial expression, and wearing the fashion item corresponding to the description 714 and expression 716. If the shareable content item feed system 590 fails to identify any content item that includes the depiction of the first user with the pose, facial expression, and wearing the fashion item corresponding to the description 714 and expression 716, the shareable content item feed system 590 performs operations to generate a new content item using the first suggested scenario 710.

In response to identifying one or more content items that include the depiction of the first user with the pose, facial expression, and wearing the fashion item corresponding to the description 714 and expression 716, the shareable content item feed system 590 further determines whether the content items feature a background matching the image description of the first suggested scenario 710. If so, the shareable content item feed system 590 selects a particular content item from such content items that feature the matching background and applies the message 718 to the selected particular content item. In response to determining that none of the content items include matching backgrounds corresponding to the image description, the shareable content item feed system 590 can modify one of the content items to replace a background with a generic or LLM generated background that does match the image description and/or can provide the first suggested scenario 710 to the LLM to generate a new content item corresponding to the first suggested scenario 710.

For example, the shareable content item feed system 590 can determine that the selected first suggested scenario 710 includes the message 718. In such cases, the shareable content item feed system 590 retrieves the text string specified in the message 718 and overlays the text string on the particular content item (e.g., a content item that was automatically generated or selected based on determining that the content item depicts the person in a pose, expression, and wearing a fashion item matching the first suggested scenario 710 and having a background corresponding to the image description). For example, the shareable content item feed system 590 modifies the selected particular content item by overlaying the text of the message 718 at a position 15% below a center of the content item. The shareable content item feed system 590 can append a graphical indicator (representing to a consumer that the caption was automatically generated by the LLM) at the beginning of the text and the same graphical indicator at the end of the text.

In some cases, the shareable content item feed system 590 can select (e.g., randomly) the second suggested scenario 720 from various scenarios. The shareable content item feed system 590 can determine that the second suggested scenario 720 includes the first set of descriptions 722 for a first participant and second set of descriptions 724 of a second participant to depict in a same content item. In such cases, the shareable content item feed system 590 retrieves the image description and the multiple participant details from the second suggested scenario 720. For example, the shareable content item feed system 590 can access visual tags associated with a recent set of content items (e.g., content items captured within the past six months) to determine whether two people are depicted in the content item. The shareable content item feed system 590 can then determine whether identities of the two people depicted in the content item correspond to the visual identifiers of the first user and second users identified by the first set of descriptions 722 and the second set of descriptions 724.

For example, the shareable content item feed system 590 can retrieve one or more images that are known to depict the first user identified by the first set of descriptions 722. The shareable content item feed system 590 can then compare facial features of the first user with facial features of the two people depicted in the identified set of content items that depict the multiple people. The shareable content item feed system 590 can form an additional subset of content items that only depict two people with facial features of one or more of the people corresponding to the identity of the first user based on the comparison. The shareable content item feed system 590 can, simultaneously or after forming the additional subset of content items, determine whether the content items also depict another person with facial features matching the second set of descriptions 724. This results in a set of content items that exclusively depict two persons matching the first set of descriptions 722 and the second set of descriptions 724.

The shareable content item feed system 590 can then further filter the additional subset of content items based on a pose, facial expression, and fashion items worn by the first user depicted in the additional subset of content items and the pose, facial expression, and fashion items worn by the second user. Specifically, the shareable content item feed system 590 can determine whether any of the additional subset of content items depict the first user in the pose, facial expression, and wearing the fashion item corresponding to the first set of descriptions 722 and depict the second user in the pose, facial expression, and wearing the fashion item corresponding to the second set of descriptions 724. If the shareable content item feed system 590 fails to identify any such content item, the shareable content item feed system 590 performs operations to generate a new content item using the second suggested scenario 720. When searching for images that depict the two people matching the description of the first set of descriptions 722 and the second set of descriptions 724, the shareable content item feed system 590 can prioritize content items that depict real-world versions of the users over avatars or bitmoji representations of the users. If a particular content item includes a bitmoji or avatar representation of the first user and a real-world version of the second user, the shareable content item feed system 590 discards such a content item. If none of the content items include real-world versions of both the first and second users, the shareable content item feed system 590 then determines if any of the content items include depictions of first and second avatar or bitmoji versions of the first and second users that correspond to the first set of descriptions 722 and the second set of descriptions 724.

In response to identifying one or more content items that include the depiction of the first and second users with the poses, facial expressions, and wearing the fashion items corresponding to the first set of descriptions 722 and the second set of descriptions 724, the shareable content item feed system 590 further determines whether the content items feature a background matching the image description of the second suggested scenario 720. If so, the shareable content item feed system 590 selects a particular content item from such content items that feature the matching background and applies the message 728 to the selected particular content item, as discussed above. In response to determining that none of the content items includes a matching background corresponding to the image description, the shareable content item feed system 590 can modify one of the content items to replace a background with a generic or LLM generated background that does match the image description and/or can provide the second suggested scenario 720 to the LLM to generate a new content item corresponding to the second suggested scenario 720.

Figure 8:
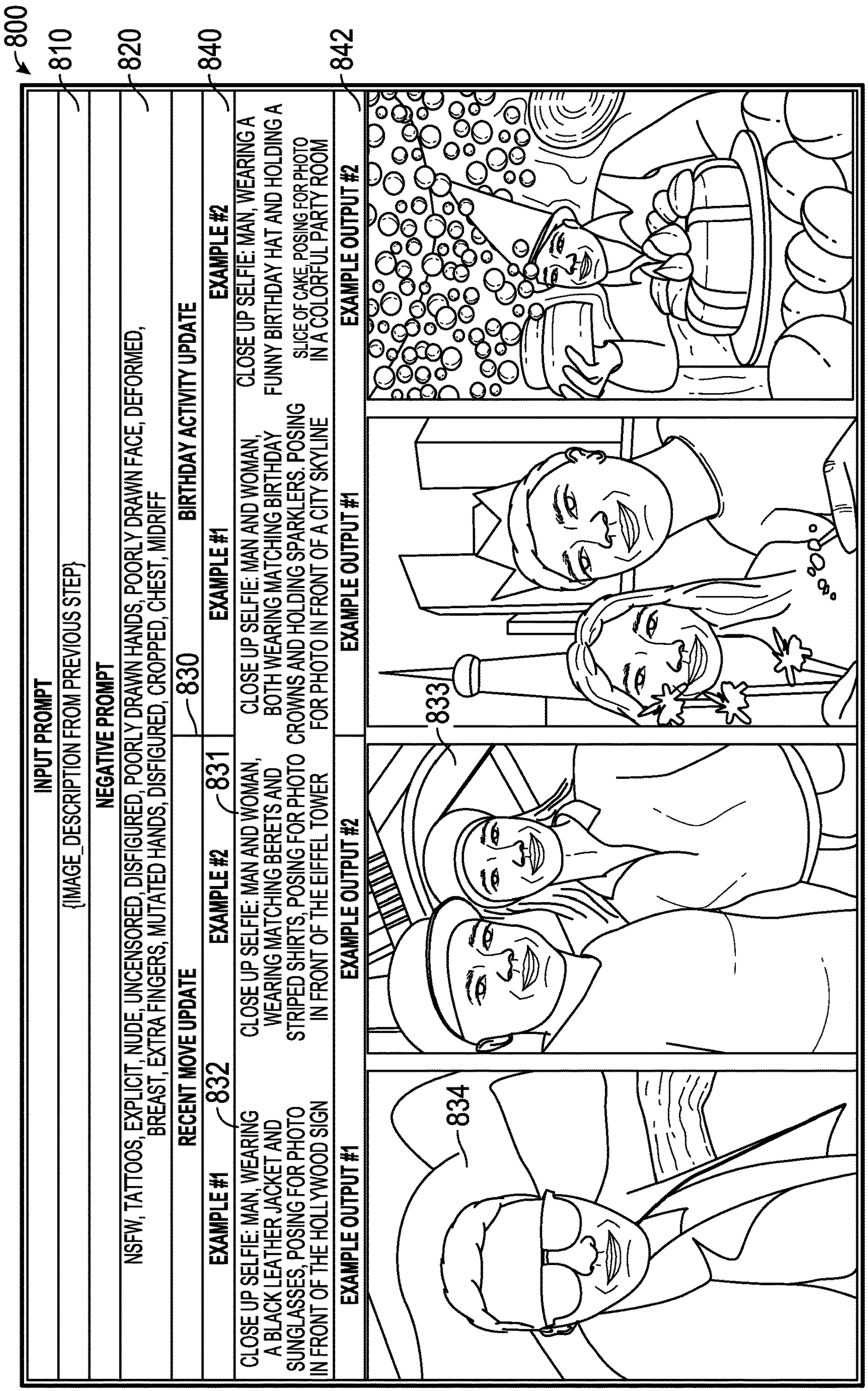

In some cases, the shareable content item feed system 590 fails to identify any existing content item that matches the first suggested scenario 710 and/or the second suggested scenario 720 that is selected. In such cases, the shareable content item feed system 590 generates a prompt 800, shown in FIG. 8, with instructions for an LLM to generate a new content item matching the selected scenario. Specifically, the prompt 800 includes an instruction 810 that includes the image description field 721 (if the second suggested scenario 720 is selected) or the image description of the first suggested scenario 710 (if the first suggested scenario 710 is selected). The prompt 800 can include one or more negative prompts 820 to prevent generation of content items that fail to meet safety criteria. The LLM can process the prompt 800 and generate a new content item that matches the selected suggested scenario.

For example, in case of a first event 830 associated with the second user, a first example prompt 832 can be provided to the LLM corresponding to the first suggested scenario 710. As a result of processing the first example prompt 832, the LLM generates a first new content item 834 that includes a depiction of a person with an expression, pose, and outfit or fashion item matching the first suggested scenario 710 and with a background matching the first suggested scenario 710. The shareable content item feed system 590 can identify a face in the first new content item 834 and can replace the face with a real-world face corresponding to the first user (or user identified by the user identifier 712). The shareable content item feed system 590 can then overlay the message 718 on the modified first content item and provide that modified first content item to the first user as a suggestion to share with the second user. For example, the shareable content item feed system 590 can provide a notification to the first user on the interaction client 104 of the first user with an option to send the modified first content item to the second user.

As another example of the first event 830, a second example prompt 831 can be provided to the LLM corresponding to the second suggested scenario 720. As a result of processing the second example prompt 831, the LLM generates a second new content item 833 that includes a depiction of two people with expressions, poses, and outfits or fashion items matching the second suggested scenario 720 and with a background matching the second suggested scenario 720. The shareable content item feed system 590 can identify faces in the second new content item 833 and can replace the faces with a real-world face corresponding to the first user and the second user (identified respectively by the first set of descriptions 722 and second set of descriptions 724). The shareable content item feed system 590 can then overlay the message 728 on the modified second content item and provide that modified second content item to the first user as a suggestion to share with the second user. For example, the shareable content item feed system 590 can provide a notification to the first user on the interaction client 104 of the first user with an option to send the modified second content item to the second user.

For example, in case of a second event 840 associated with the second user, a third example prompt can be provided to the LLM corresponding to a selected scenario representing the second event 840. As a result of processing the third example prompt, the LLM generates one or more additional new content items 842 in a similar manner as first new content item 834 and second new content item 833. In some cases, the instruction 810 includes example real-world depictions of the first and/or second users and the LLM can generate the resulting content items with depictions of the first and/or second users. This avoids the need to perform the face-replacing operations for the resulting images.

Figure 9:
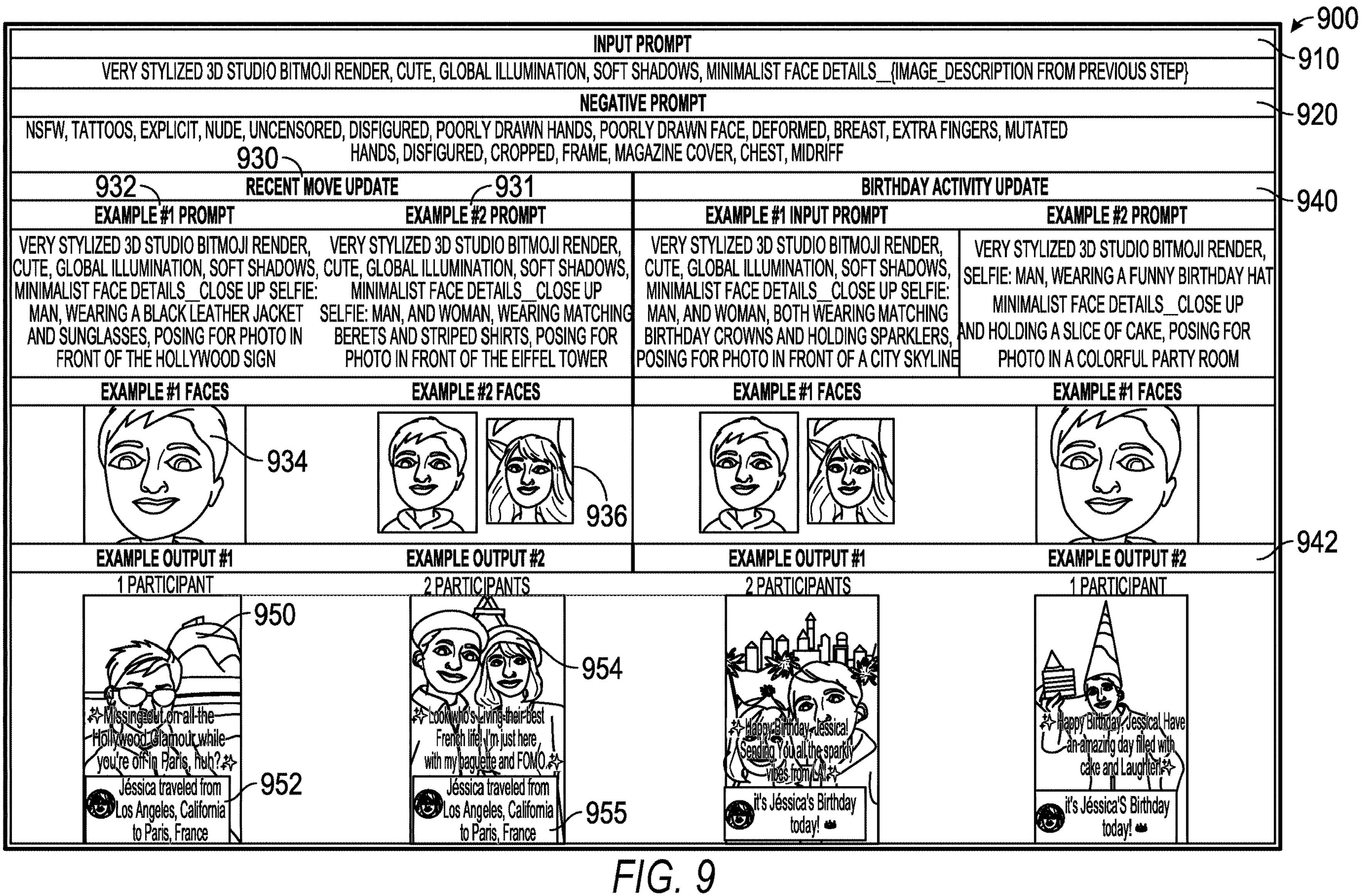

In some cases, the shareable content item feed system 590 fails to identify any existing content item that matches the first suggested scenario 710 and/or the second suggested scenario 720 that is selected. In such cases, the shareable content item feed system 590 generates a prompt 900, shown in FIG. 9, with instructions for an LLM to generate a new content item matching the selected scenario and that includes stylized avatar depictions of the first and/or second users. Specifically, the prompt 900 includes an instruction 910 that includes the image description field 721 (if the second suggested scenario 720 is selected) or the image description of the first suggested scenario 710 (if the first suggested scenario 710 is selected) with a request to generate very stylized 3D avatar/bitmoji renderings of the users. The instruction 910 can include an example bitmoji/avatar of each of the first and/or second users. The prompt 900 can include one or more negative prompts 920 to prevent generation of content items that fail to meet safety criteria. The LLM can process the prompt 900 and generate a new content item that matches the selected suggested scenario using stylized renderings of the bitmoji/avatar representations of the first and/or second users.

For example, in case of a first event 930 associated with the second user, a first example prompt 932 can be provided to the LLM corresponding to the first suggested scenario 710 along with an example avatar 934 of the first user identified in the first suggested scenario 710. As a result of processing the first example prompt 932, the LLM generates a first stylized content item 950 that includes a depiction of the avatar 934 with an expression, pose, and outfit or fashion item matching the first suggested scenario 710 and with a background matching the first suggested scenario 710. The shareable content item feed system 590 can then overlay the message 718 on the modified first stylized content item and can also include a sticker 952 (or other graphical element) that includes information associated with the first event 930. The sticker 952 can be rotated by a certain number of degrees relative to the message 718. The shareable content item feed system 590 can provide that modified first stylized content item to the first user as a suggestion to share with the second user. For example, the shareable content item feed system 590 can provide a notification to the first user on the interaction client 104 of the first user with an option to send the modified first stylized content item to the second user. In some cases, any content item generated using the suggested scenarios can be presented to the user for a limited time period, such as 72 hours after which the content item is discarded or deleted.

As another example of the first event 830, a second example prompt 931 can be provided to the LLM corresponding to the second suggested scenario 720 along with example avatars 936 of the first user and second user identified in the second suggested scenario 720. As a result of processing the second example prompt 931, the LLM generates a second stylized content item 954 that includes a depiction of avatars of the first and second users with an expressions, poses, and outfits or fashion items matching the second suggested scenario 720 and with a background matching the second suggested scenario 720. The shareable content item feed system 590 can then overlay the message 718 on the modified second stylized content item and can also include a sticker 955 that includes information associated with the first event 930. The shareable content item feed system 590 can provide the modified second stylized content item to the first user as a suggestion to share with the second user. For example, the shareable content item feed system 590 can provide a notification to the first user on the interaction client 104 of the first user with an option to send the modified second stylized content item to the second user.

For example, in case of a second event 940 associated with the second user, a third example prompt can be provided to the LLM corresponding to a selected scenario representing the second event 940. As a result of processing the third example prompt, the LLM generates one or more additional new content items 942 in a similar manner as first stylized content item 950 and second stylized content item 954.

Figure 10:
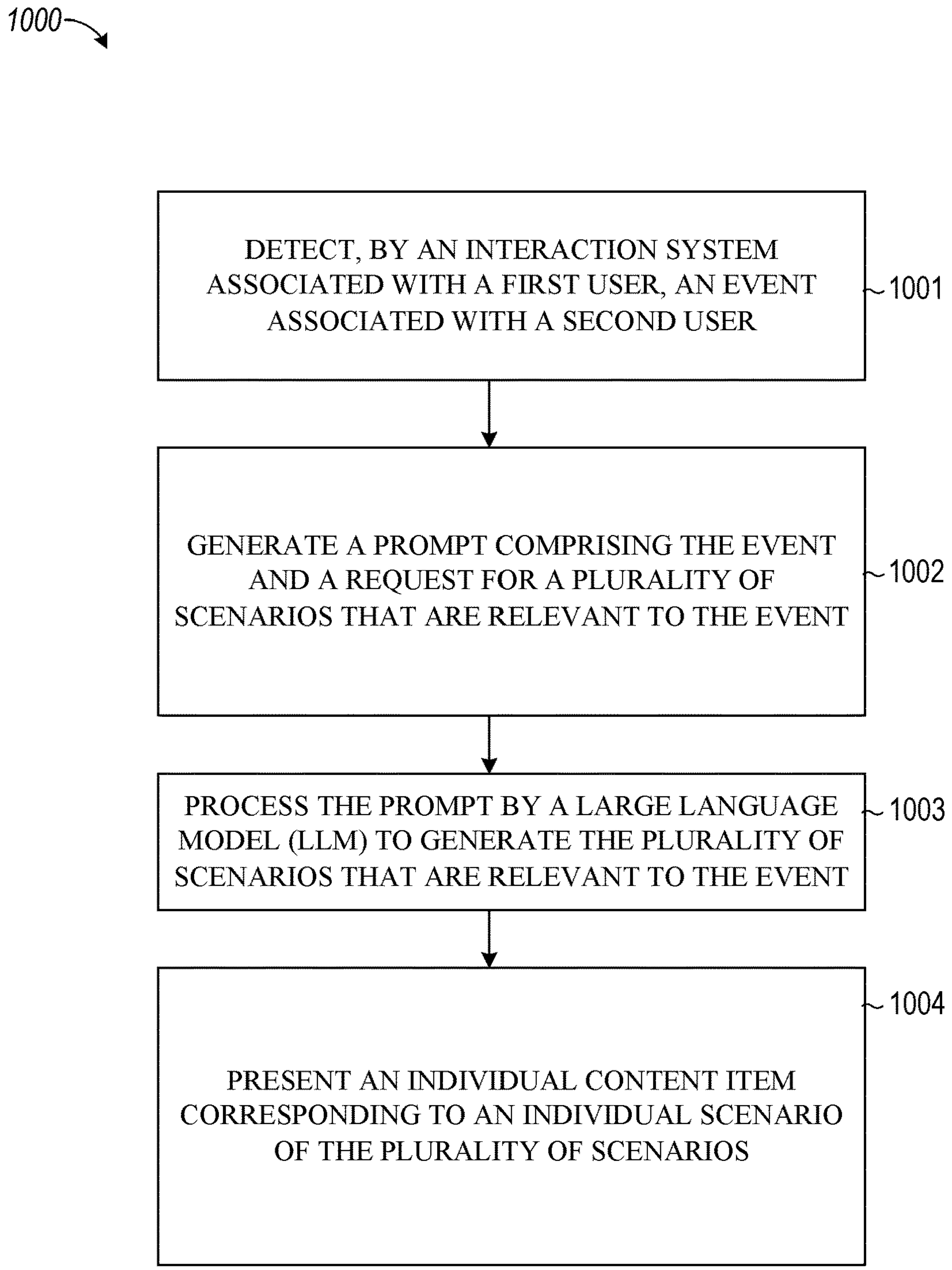
FIG. 10 is a flowchart illustrating example operations and methods of the sharable content item feed system, in accordance with some examples.

FIG. 10 is a flowchart of a process or method 1000 performed by the shareable content item feed system 590, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, the shareable content item feed system 590 (e.g., a user system 102 or a server) detects, by an interaction system associated with a first user, an event associated with a second user, as discussed above.

At operation 1002, the shareable content item feed system 590 generates a prompt comprising the event and a request for a plurality of scenarios that are relevant to the event, as discussed above.

At operation 1003, the shareable content item feed system 590 uses an LLM to process the prompt to generate the plurality of scenarios that are relevant to the event, as discussed above.

At operation 1004, the shareable content item feed system 590 presents an individual content item corresponding to an individual scenario of the plurality of scenarios, as discussed above.

EXAMPLES

Example 1. A method comprising: detecting, by an interaction system associated with a first user, an event associated with a second user; generating a prompt comprising the event and a request for a plurality of scenarios that are relevant to the event; processing the prompt by a large language model (LLM) to generate the plurality of scenarios that are relevant to the event; and presenting an individual content item corresponding to an individual scenario of the plurality of scenarios.

Example 2. The method of Example 1, wherein the second user is in a list of friends of an account associated with the first user.

Example 3. The method of any one of Examples 1-2, wherein the prompt comprises a current date, information about the first user including a location of the first user, information about the second user, and details about the event.

Example 4. The method of Example 3, wherein the event comprises at least one of moving to a different city, a birthday, or an anniversary of when the first user became associated with the second user.

Example 5. The method of any one of Examples 1-4, further comprising: identifying a subset of friends associated with the first user; and restricting detection of events for triggering generation of the prompt to events associated with the subset of friends, the second user being included in the subset of friends.

Example 6. The method of Example 5, wherein the subset of friends comprises friends labeled as best friends by the first user.

Example 7. The method of any one of Examples 5-6, further comprising: accessing a chat history associated with the first user; identifying, in the chat history, a set of messages that were exchanged within a specified time interval; and selecting at least a portion of the subset of friends by identifying one or more friends that were involved in the exchange of the set of messages.

Example 8. The method of any one of Examples 1-7, wherein the generation of the prompt is conditioned on a current location of the first user relative to a location of the second user.

Example 9. The method of any one of Examples 1-8, wherein each of the plurality of scenarios comprises information about who is in a respective scenario, a pose or activity performed by each person present in the respective scenario, an expression of each person present in the respective scenario, and a description of a background of the respective scenario.

Example 10. The method of Example 9, wherein one or more of the plurality of scenarios includes a message for a caption.

Example 11. The method of any one of Examples 1-10, wherein the prompt comprises instructions to include a message about fear of missing out (FOMO) in response to a location of the first user being greater than a threshold distance of a location of the second user.

Example 12. The method of any one of Examples 1-11, wherein the plurality of scenarios comprise: a first scenario that includes a first scenario description, a first set of details about a pose and expression of only a first person, a first message, and indication of whether the first person corresponds to the first user or the second user; and a second scenario that includes a second scenario description, a second set of details about a pose and expression of the first person and a pose and expression of a second person, a second message, a first indication of whether the first person corresponds to the first user or the second user, and a second indication of whether the second person corresponds to the first user or the second user.

Example 13. The method of Example 12, further comprising: randomly selecting the first scenario from the plurality of scenarios.

Example 14. The method of Example 13, further comprising: determining that the first scenario corresponds to the first user; searching a collection of previously captured content items that depict only the first user based on the first scenario to provide the individual content item that depicts the first user having a pose and expression matching the first set of details.

Example 15. The method of Example 14, further comprising: appending to a front portion of the first message a graphical element that indicates that the first message was generated by the LLM; appending to an end portion of the first message the graphical element that indicates that the first message was generated by the LLM; and overlaying the first message with the graphical element in the first and end portions on the individual content item to generate the individual content item that is presented.

Example 16. The method of any one of Examples 14-15, further comprising: determining that the collection of previously captured content items fails to include content items that depict the first user having a pose and expression matching the first set of details; and in response to determining that the collection of previously captured content items fails to include content items that depict the first user having the pose and expression matching the first set of details, generating an additional prompt with instructions for the LLM to generate a new image that depicts the first scenario, wherein faces depicted in the new image are replaced with representations of faces of the first and second users.

Example 17. The method of Example 16, wherein the additional prompt comprises an avatar of the first user, and wherein the new image depicts the avatar in the pose and expression matching the first set of details.

Example 18. The method of any one of Examples 12-17, further comprising: randomly selecting the second scenario from the plurality of scenarios; and in response to determining that a collection of previously captured content items fails to include content items that depict one of the first and second users having a pose and expression matching the second set of details, generating an additional prompt with instructions for the LLM to generate a new image that depicts the second scenario using first and second avatars corresponding to the first and second users.

Example 19. A system comprising: at least one processor; and at least one memory component having instructions stored thereon that, when executed by the at least one processor, cause the at least one processor to perform operations comprising: detecting, by an interaction system associated with a first user, an event associated with a second user; generating a prompt comprising the event and a request for a plurality of scenarios that are relevant to the event; processing the prompt by a large language model (LLM) to generate the plurality of scenarios that are relevant to the event; and presenting an individual content item corresponding to an individual scenario of the plurality of scenarios.

Example 20. A non-transitory computer-readable storage medium having stored thereon instructions that, when executed by at least one processor, cause the at least one processor to perform operations comprising: detecting, by an interaction system associated with a first user, an event associated with a second user; generating a prompt comprising the event and a request for a plurality of scenarios that are relevant to the event; processing the prompt by a large language model (LLM) to generate the plurality of scenarios that are relevant to the event; and presenting an individual content item corresponding to an individual scenario of the plurality of scenarios.

Machine Architecture

Figure 11:
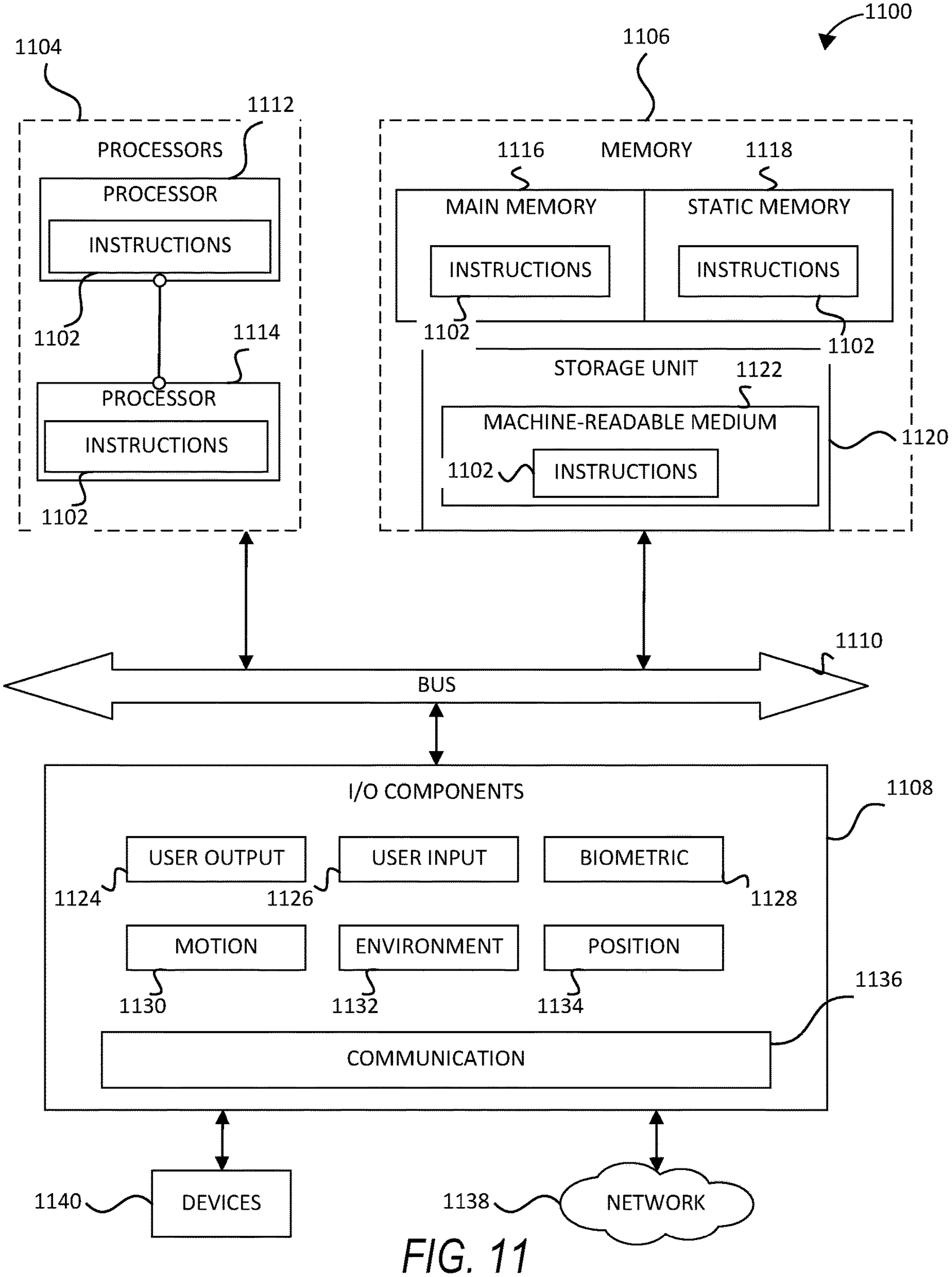
FIG. 11 is a diagrammatic representation of a machine in the form of a computer system within which a set of instructions may be executed to cause the machine to perform any one or more of the methodologies discussed herein, in accordance with some examples.

FIG. 11 is a diagrammatic representation of a machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output (I/O) components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, all accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request.

Further, such biometric data may be used for very limited purposes, such as identification verification. To ensure limited and authorized use of biometric information and other personally identifiable information (PII), access to this data is restricted to authorized personnel only, if allowed at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad, or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a universal serial bus (USB)).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via IP geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., HTTP). Similarly, the instructions 1102 may be transmitted or received using a transmission medium via a coupling (e.g., a peer-to-peer coupling) to the devices 1140.

Software Architecture

Figure 12:
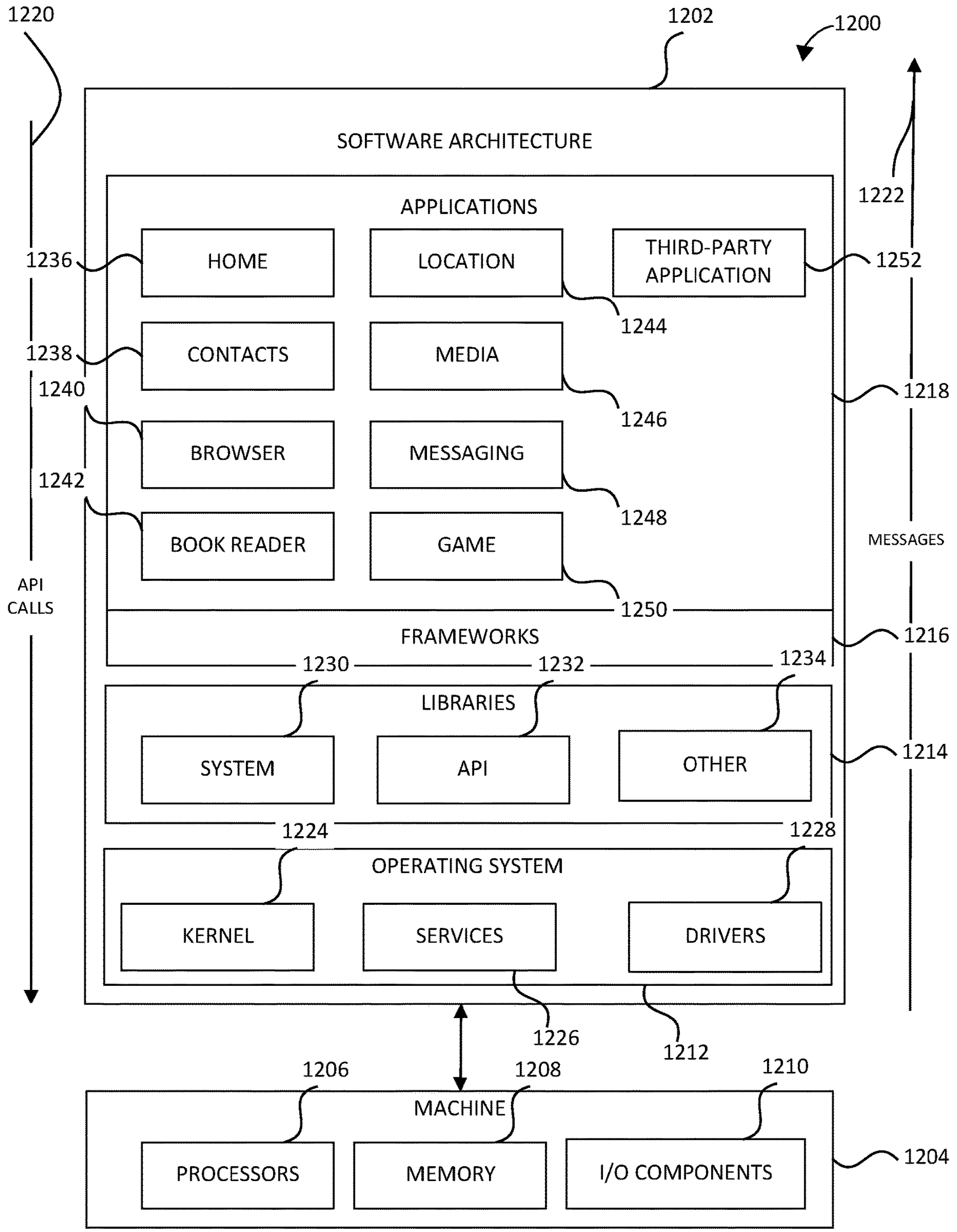
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various GUI functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

System with Head-Wearable Apparatus

Figure 13:
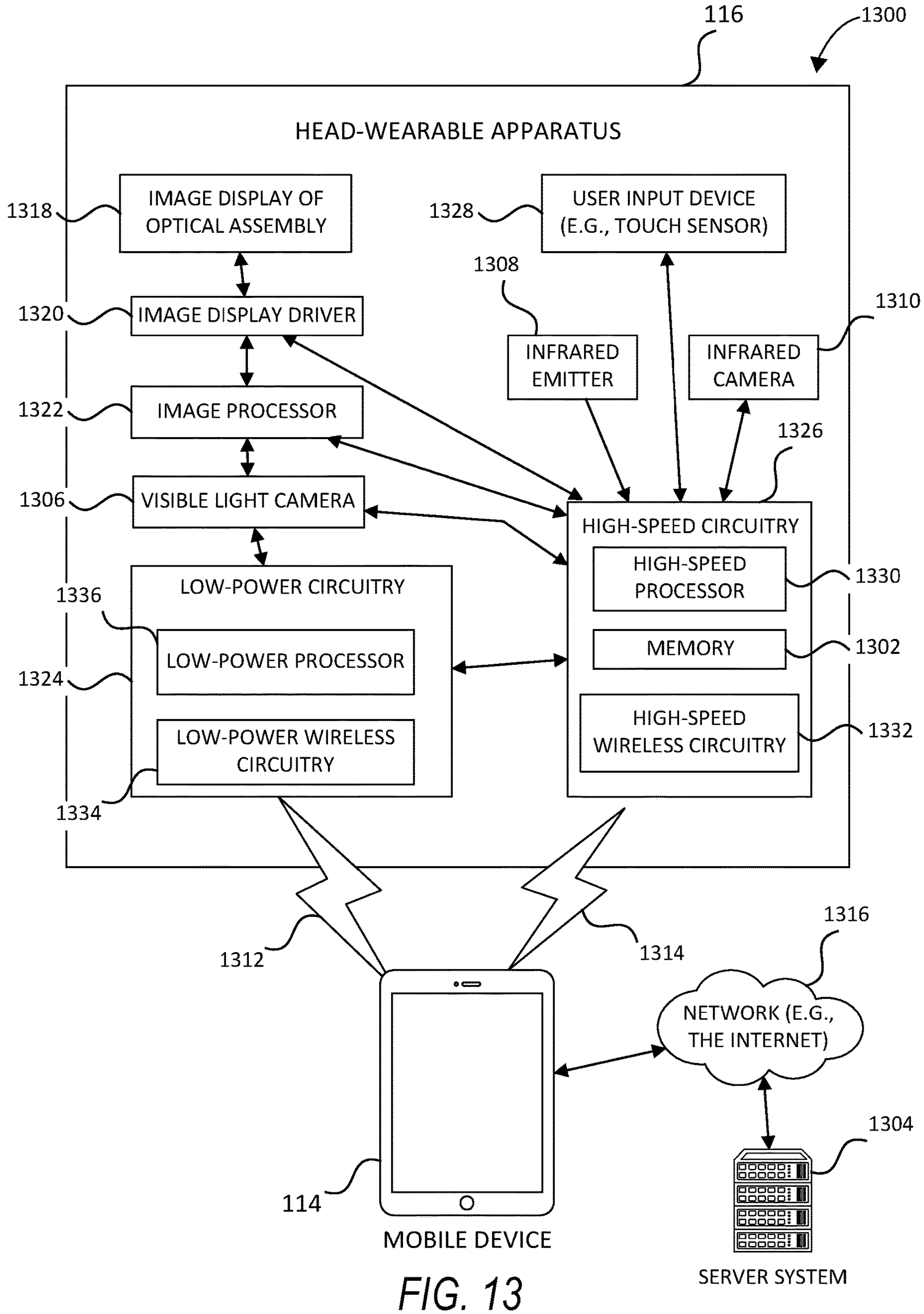
FIG. 13 illustrates a system in which a head-wearable apparatus may be implemented, in accordance with some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 1316.

The head-wearable apparatus 116 includes one or more cameras, each of which may be, for example, a visible light camera 1306, an infrared emitter 1308, and an infrared camera 1310.

The mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a GUI, to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as PNG, JPEG, Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the GUI of the presented image.

The components shown in FIG. 13 for the head-wearable apparatus 116 are located on one or more circuit boards, for example a printed circuit board (PCB) or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include a storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 116. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WiFi. In some examples, other high-speed communications standards may be implemented by the high-speed wireless circuitry 1332.

Low-power wireless circuitry 1334 and the high-speed wireless circuitry 1332 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318. While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 116 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection

1312, or high-speed wireless connection 1314. Mobile device 114 can further store at least portions of the instructions for generating binaural audio content in the memory of mobile device 114 to implement the functionality described herein.

Output components of the head-wearable apparatus 116 include visual components, such as a display such as a LCD, a PDP, a LED display, a projector, or a waveguide. The image displays of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a BMI system that allows communication between the brain and an external device or machine. This may be achieved by recording brain activity data, translating this data into a format that can be understood by a computer, and then using the resulting signals to control the device or machine.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1312 and high-speed wireless connection 1314 from the mobile device 114 via the low-power wireless circuitry 1334 or high-speed wireless circuitry 1332.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multi-processor system, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or interaction on the user device, including interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multi-processor system, microprocessor-based or programmable consumer electronics, game console, STB, or any other communication device that a user may use to access a network.

"Communication network" refers to one or more portions of a network that may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network, and the coupling may be a CDMA connection, a GSM connection, or other types of cellular or wireless coupling. In this example, the coupling may implement any of a variety of types of data transfer technology, such as 1×RTT, EVDO technology, GPRS technology, EDGE technology, 3GPP including 3G, 4G networks, UMTS, HSPA, WiMAX, LTE standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

detecting, by an interaction system associated with a first user, an event associated with a second user;

generating a prompt comprising the event and a request for a plurality of scenarios that are relevant to the event;

processing the prompt by a large language model (LLM) to generate the plurality of scenarios that are relevant to the event;

processing one or more fields of an individual scenario of the plurality of scenarios to automatically search for content items that match a description of the one or more fields of the individual scenario; and presenting an individual content item of the content items that match the description of the one or more fields of the individual scenario.

2. The method of claim 1, wherein the second user is in a list of friends of an account associated with the first user, further comprising:

generating, by the LLM, a plaintext caption to overlay on the individual content item corresponding to the description of the one or more fields of the individual scenario.

3. The method of claim 1, wherein the prompt comprises a current date, information about the first user including a location of the first user, information about the second user, and details about the event.

4. The method of claim 3, wherein the event comprises at least one of moving to a different city, a birthday, or an anniversary of when the first user became associated with the second user.

5. The method of claim 1, further comprising:

identifying a subset of friends associated with the first user; and restricting detection of events for triggering generation of the prompt to events associated with the subset of friends, the second user being included in the subset of friends.

6. The method of claim 5, wherein the subset of friends comprises friends labeled as best friends by the first user.

7. The method of claim 5, further comprising:
accessing a chat history associated with the first user;
identifying, in the chat history, a set of messages that were exchanged within a specified time interval; and
selecting at least a portion of the subset of friends by identifying one or more friends that were involved in the exchange of the set of messages.

8. The method of claim 1, wherein the generation of the prompt is conditioned on a current location of the first user relative to a location of the second user.

9. The method of claim 1, wherein each of the plurality of scenarios comprises information about who is in a respective scenario, a pose or activity performed by each person present in the respective scenario, an expression of each person present in the respective scenario, and a description of a background of the respective scenario.

10. The method of claim 1, wherein the plurality of scenarios comprise a first scenario that includes a first scenario description, a first set of details about a pose and expression of only a first person, a first message, and indication of whether the first person corresponds to the first user or the second user.

11. The method of claim 1, wherein the prompt comprises instructions to include a message about fear of missing out (FOMO) in response to a location of the first user being greater than a threshold distance of a location of the second user.

12. The method of claim 1, wherein the plurality of scenarios comprise:
a first scenario that includes a first scenario description, a first set of details about a pose and expression of only a first person, a first message, and indication of whether the first person corresponds to the first user or the second user; and
a second scenario that includes a second scenario description, a second set of details about a pose and expression of the first person and a pose and expression of a second person, a second message, a first indication of whether the first person corresponds to the first user or the second user, and a second indication of whether the second person corresponds to the first user or the second user.

13. The method of claim 12, further comprising:
randomly selecting the first scenario from the plurality of scenarios.

14. The method of claim 13, further comprising:
determining that the first scenario corresponds to the first user; and
searching a collection of previously captured content items that depict only the first user based on the first scenario to provide the individual content item that depicts the first user having a pose and expression matching the first set of details.

15. The method of claim 14, further comprising:
appending to a front portion of the first message a graphical element that indicates that the first message was generated by the LLM;
appending to an end portion of the first message the graphical element that indicates that the first message was generated by the LLM; and
overlaying the first message with the graphical element in the first and end portions on the individual content item to generate the individual content item that is presented.

16. The method of claim 14, further comprising:
determining that the collection of previously captured content items fails to include content items that depict the first user having a pose and expression matching the first set of details; and
in response to determining that the collection of previously captured content items fails to include content items that depict the first user having the pose and expression matching the first set of details, generating an additional prompt with instructions for the LLM to generate a new image that depicts the first scenario, wherein faces depicted in the new image are replaced with representations of faces of the first and second users.

17. The method of claim 16, wherein the additional prompt comprises an avatar of the first user; and
wherein the new image depicts the avatar in the pose and expression matching the first set of details.

18. The method of claim 12, further comprising:
randomly selecting the second scenario from the plurality of scenarios; and
in response to determining that a collection of previously captured content items fails to include content items that depict one of the first and second users having a pose and expression matching the second set of details, generating an additional prompt with instructions for the LLM to generate a new image that depicts the second scenario using first and second avatars corresponding to the first and second users.

19. A system comprising:
at least one processor; and
at least one memory component having instructions stored thereon that, when executed by the at least one processor, cause the at least one processor to perform operations comprising:
detecting, by an interaction system associated with a first user, an event associated with a second user;
generating a prompt comprising the event and a request for a plurality of scenarios that are relevant to the event;
processing the prompt by a large language model (LLM) to generate the plurality of scenarios that are relevant to the event;
processing one or more fields of an individual scenario of the plurality of scenarios to automatically search for content items that match a description of the one or more fields of the individual scenario; and
presenting an individual content item of the content items that match the description of the one or more fields of the individual scenario.

20. A non-transitory computer-readable storage medium having stored thereon instructions that, when executed by at least one processor, cause the at least one processor to perform operations comprising:
detecting, by an interaction system associated with a first user, an event associated with a second user;
generating a prompt comprising the event and a request for a plurality of scenarios that are relevant to the event;
processing the prompt by a large language model (LLM) to generate the plurality of scenarios that are relevant to the event;
processing one or more fields of an individual scenario of the plurality of scenarios to automatically search for content items that match a description of the one or more fields of the individual scenario; and
presenting an individual content item of the content items that match the description of the one or more fields of the individual scenario.

* * * * *